(12) United States Patent
Itoh et al.

(10) Patent No.: US 9,069,464 B2
(45) Date of Patent: Jun. 30, 2015

(54) DATA PROCESSING APPARATUS, OPERATION ACCEPTING METHOD, AND NON-TRANSITORY COMPUTER-READABLE RECORDING MEDIUM ENCODED WITH BROWSING PROGRAM

(71) Applicant: Konica Minolta, Inc., Chiyoda-ku (JP)

(72) Inventors: Ayumi Itoh, Takarazuka (JP); Masayuki Kawamoto, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 31 days.

(21) Appl. No.: 14/090,314

(22) Filed: Nov. 26, 2013

(65) Prior Publication Data

US 2014/0145956 A1 May 29, 2014

(30) Foreign Application Priority Data

Nov. 28, 2012 (JP) ................................. 2012-260148

(51) Int. Cl.
*G06F 3/12* (2006.01)
*G06F 3/0488* (2013.01)
*G06K 15/00* (2006.01)

(52) U.S. Cl.
CPC .................. *G06F 3/04883* (2013.01)

(58) Field of Classification Search
CPC .................................. H04N 1/00469
See application file for complete search history.

(56) References Cited

U.S. PATENT DOCUMENTS

| 2009/0228901 A1 | 9/2009 | Beaver et al. |
| 2012/0229409 A1 | 9/2012 | Ohashi et al. |
| 2014/0160046 A1* | 6/2014 | Kawamoto et al. ........... 345/173 |

FOREIGN PATENT DOCUMENTS

| JP | 2009-211704 A | 9/2009 |
| JP | 2010-108103 A | 5/2010 |
| JP | 2011-118629 A | 6/2011 |
| JP | 2012203440 A | 10/2012 |

OTHER PUBLICATIONS

Office Action (Notice of Ground for Rejection) dated Oct. 21, 2014, issued by the Japanese Patent Office in corresponding Japanese Patent Application No. 2012-260148 and an English translation of the Office Action. (9 pages).
HTML 5 Big Change to Use of Web Browser, vol. 14, No. 11, Nikkei Linux, Japan Nikkei Business Publications, Inc., Oct. 8, 2012, and partial English translation. (10 pages).

* cited by examiner

*Primary Examiner* — Dov Popovici
(74) *Attorney, Agent, or Firm* — Buchanan Ingersoll & Rooney PC

(57) ABSTRACT

A data processing apparatus includes a browsing portion to execute a process of the type corresponding to a gesture event, a mouse event generating portion to generate a mouse event including positional information indicating the position detected by a position detecting portion, and a gesture event determining portion to determine one of gesture events on the basis of the mouse event(s). The browsing portion includes a display image generating portion operable, when content includes a description for displaying an embedded image generated as an application program is executed, to generate a display image with the embedded image arranged in an embedded area, and a selecting portion operable, when the position indicated by one of the mouse event(s) from which the gesture event has been determined falls within the embedded area, to select either the gesture event or the mouse event(s) on the basis of the type of the gesture event.

24 Claims, 10 Drawing Sheets

F I G. 4
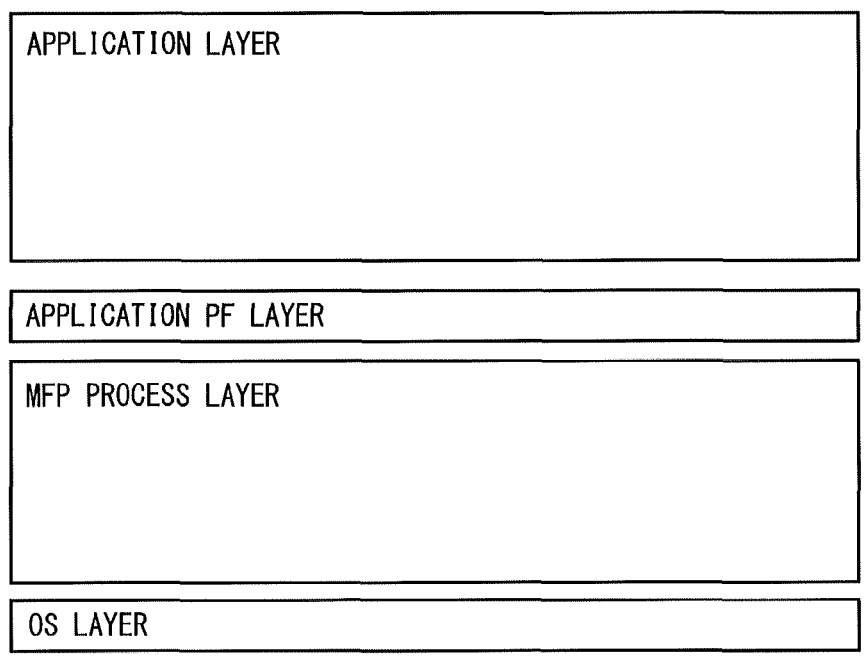

F I G. 5
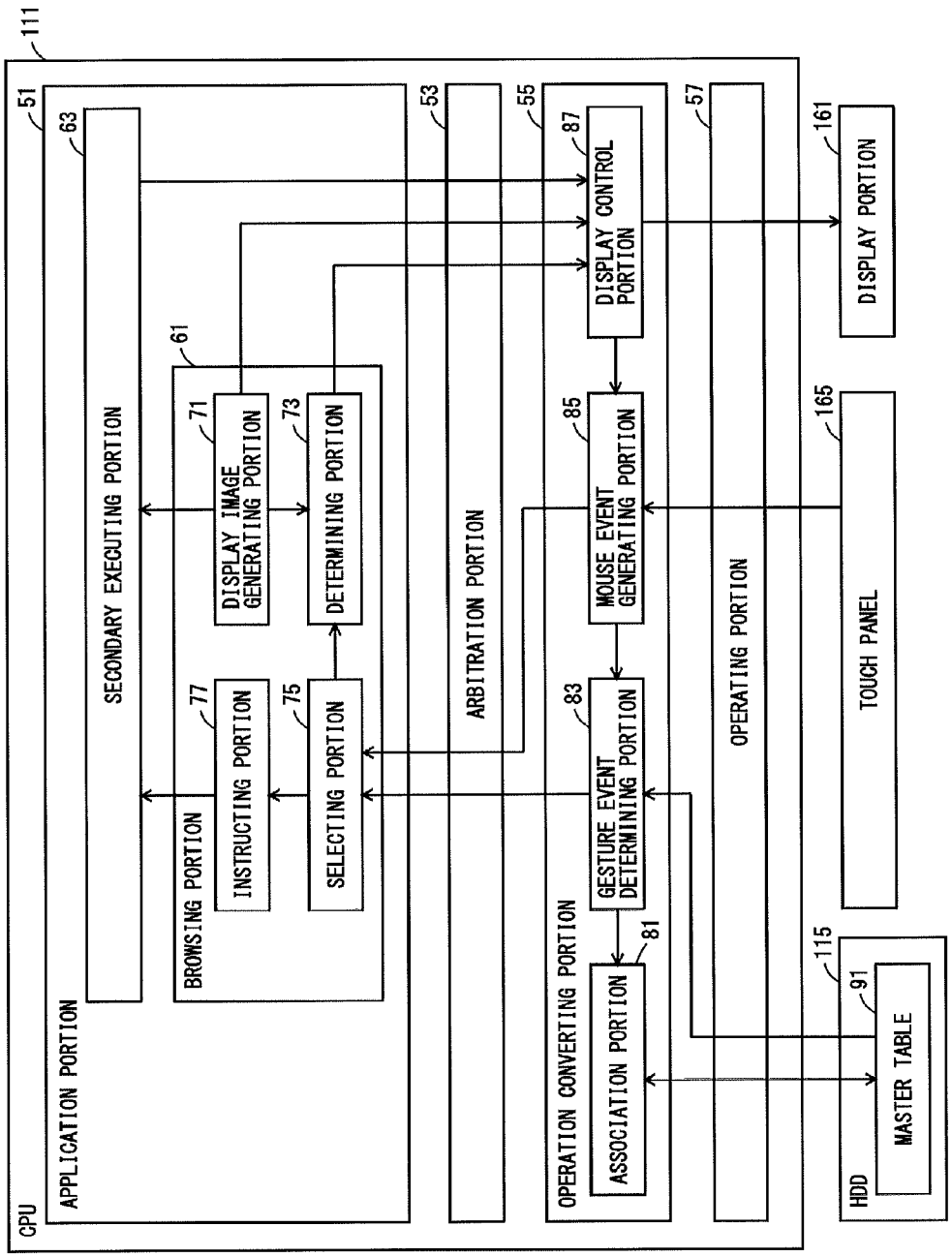

FIG. 6

MASTER TABLE            <u>91</u>

| PROCESS | GESTURE |
|---|---|
| PAGE TURNING | SWIPE |
| ENLARGEMENT | PINCH OUT |
| REDUCTION | PINCH IN |
| ROTATION | ROTATION |
| SCROLL | FLICK |
| SELECT CONTENT | DOUBLE TAP |

DATA PROCESSING APPARATUS, OPERATION ACCEPTING METHOD, AND NON-TRANSITORY COMPUTER-READABLE RECORDING MEDIUM ENCODED WITH BROWSING PROGRAM

This application is based on Japanese Patent Application No. 2012-260148 filed with Japan Patent Office on Nov. 28, 2012, the entire content of which is hereby incorporated by reference.

BACKGROUND OF THE INVENTION

1. Field of the Invention

The present invention relates to a data processing apparatus, an operation accepting method, and a non-transitory computer-readable recording medium encoded with a browsing program. More particularly, the present invention relates to a data processing apparatus provided with a multi-touch-capable touch panel, an operation accepting method performed by the data processing apparatus, and a non-transitory computer-readable recording medium encoded with a browsing program for causing a computer to perform the operation accepting method.

2. Description of the Related Art

Some recent data processing apparatuses, typified by multi-function peripherals (MFPs), are provided with a multi-touch-capable touch panel as a user interface. The multi-touch-capable touch panel can detect a plurality of positions simultaneously designated by a user. On the other hand, some MFPs allow application programs to be installed therein. A user can customize an MFP by installing an application program according to the type of usage. Of these application programs, while some programs can accept a multi-touch operation, others cannot accept the multi-touch operation and can accept a single-touch operation. Therefore, in the case where a plurality of application programs are executed at the same time, it is necessary to switch between the mode of accepting user operations as multi-touch operations and the mode of accepting user operations as single-touch operations, for each of the application programs.

For example, Japanese Patent Laid-Open No. 2009-211704 describes a method for handling mouse events in a multi-touch device. The method includes the steps of: displaying one or more views; executing one or more software elements, each associated with a particular view; associating a multi-touch flag or an exclusive touch flag with each view; receiving one or more touches on the one or more views; and, on the basis of the value(s) of the multi-touch or exclusive touch flag(s), selectively sending one or more mouse events, each describing the corresponding received touch, to the one or more software elements associated with the one or more views on which the one or more touches were received.

Some application programs, however, output an image (view) which includes an area accepting multi-touch operations and an area accepting single-touch operations. In the conventional method, the mode of accepting user operations as multi-touch operations and the mode of accepting them as single-touch operations are switched depending upon a view. Therefore, the conventional method cannot address the case where a single view (image) includes the area accepting multi-touch operations and the area accepting single-touch operations.

SUMMARY OF THE INVENTION

An aspect of the present invention provides a data processing apparatus including a display portion capable of displaying an image, a position detecting portion capable of detecting one or more positions designated by a user on a display surface of the display portion, and a control portion, wherein the control portion includes: a browsing portion to execute a browsing program, externally acquire content described in a markup language, and display on the display portion at least a part of a display image corresponding to the acquired content, and further operable, in response to input of one of a plurality of gesture events corresponding respectively to a plurality of types of processes determined by the browsing program, to perform the one of the plurality of types of processes that corresponds to the input gesture event; a mouse event generating portion operable, in response to detection of one or more positions by the position detecting potion, to generate one or more mouse events each including a piece of positional information indicating the corresponding one of the one or more positions; and a gesture event determining portion to determine one of the plurality of gesture events on the basis of a set of one or more mouse events generated by the mouse event generating portion; wherein the browsing portion includes a display image generating portion operable, in the case where the content includes a description for displaying an embedded image to be generated as an application program different from the browsing program is executed, to generate a display image in which the embedded image generated as the application program has been executed is arranged in an embedded area determined by the content, and a selecting portion operable, in the case where the position indicated by one of the one or more mouse events on the basis of which the gesture event has been determined by the gesture event determining portion falls within the embedded area, to select either the gesture event determined by the gesture event determining portion or the set of the one or more mouse events on the basis of which the gesture event has been determined, on the basis of the type of the determined gesture event.

Another aspect of the present invention provides an operation accepting method performed by a data processing apparatus, the data processing apparatus including a display portion capable of displaying an image and a position detecting portion capable of detecting one or more positions designated by a user on a display surface of the display portion, wherein the method include: a browsing step of executing a browsing program, externally acquiring content described in a markup language, and displaying on the display portion at least a part of a display image corresponding to the acquired content, and further, in response to input of one of a plurality of gesture events corresponding respectively to a plurality of types of processes determined by the browsing program, performing the one of the plurality of types of processes that corresponds to the input gesture event; a mouse event generating step of, in response to detection of one or more positions by the position detecting potion, generating one or more mouse events each including a piece of positional information indicating the corresponding one of the one or more positions; and a gesture event determining step of determining one of the plurality of gesture events on the basis of a set of one or more mouse events generated in the mouse event generating step; wherein the browsing step includes a display image generating step of, in the case where the content includes a description for displaying an embedded image which is generated as an application program different from the browsing program is executed, generating a display image in which the embedded image generated as the application program has been executed is arranged in an embedded area determined by the content, and a selecting step of, in the case where the position indicated by one of the one or more mouse events on the basis of which the gesture event has been determined in the gesture event determining step falls within the embedded area, selecting either the gesture event determined in the gesture event determining step or the set of the one or more mouse events on the basis of which the gesture event has been determined, on the basis of the type of the determined gesture event.

Yet another aspect of the present invention provides a non-transitory computer-readable recording medium encoded with a browsing program performed by a computer which controls a data processing apparatus, the data processing apparatus including a display portion capable of displaying an image, a position detecting portion capable of detecting one or more positions designated by a user on a display surface of the display portion, a mouse event generating portion operable, in response to detection of one or more positions by the position detecting potion, to generate one or more mouse events each including a piece of positional information indicating the corresponding one of the one or more positions, and a gesture event determining portion to determine one of the plurality of gesture events on the basis of a set of one or more mouse events generated by the mouse event generating portion, wherein the program causes the computer to perform a browsing step of executing a browsing program, externally acquiring content described in a markup language, and displaying on the display portion at least a part of a display image corresponding to the acquired content, and further, in response to input of one of a plurality of gesture events corresponding respectively to a plurality of types of processes determined by the browsing program, performing the one of the plurality of types of processes that corresponds to the input gesture event, wherein the browsing step includes a display image generating step of, in the case where the content includes a description for displaying an embedded image to be generated as an application program different from the browsing program is executed, generating a display image in which the embedded image generated as the application program has been executed is arranged in an embedded area determined by the content, and a selecting step of, in the case where the position indicated by one of the one or more mouse events on the basis of which the gesture event has been determined by the gesture event determining portion falls within the embedded area, selecting either the gesture event determined by the gesture event determining portion or the set of the one or more mouse events on the basis of which the gesture event has been determined, on the basis of the type of the determined gesture event.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 4 shows an example of the software architecture of a CPU included in the MFP;

FIG. 5 is a block diagram showing, by way of example, the functions of the CPU included in the MFP, together with information stored in a HDD;

FIG. 6 shows an example of a master table;

DESCRIPTION OF THE PREFERRED EMBODIMENTS

Figure 1:
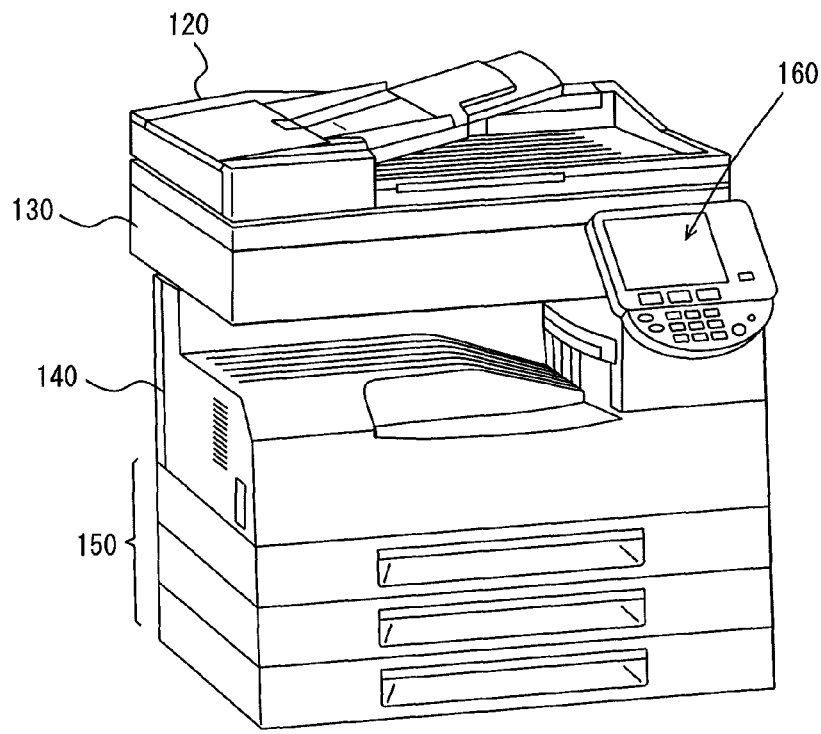
FIG. 1 is a perspective view of an MFP according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

Figure 2:
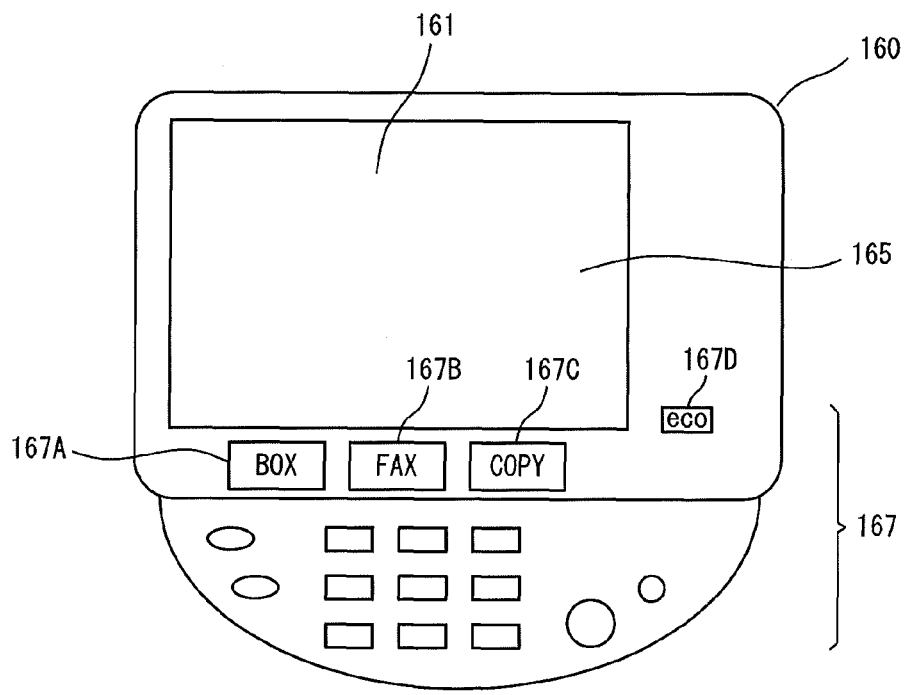
FIG. 2 is a plan view showing an example of an operation panel.

FIG. 1 is a perspective view of an MFP according to an embodiment of the present invention. FIG. 2 is a plan view showing an example of an operation panel. Referring to FIGS. 1 and 2, an MFP 100 includes: a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Operation panel 160 is arranged on an upper surface of MFP 100. Operation panel 160 includes: a display portion 161, a touch panel 165, and a hard key portion 167. Display portion 161 is, for example, a liquid crystal display (LCD), and displays an instruction menu for a user, information about acquired image data, and so on. Hard key portion 167 includes four hard keys 167A to 167D having the characters "BOX", "FAX", "COPY", and "ECO" respectively displayed thereon. Touch panel 165 is a multi-touch-capable touch panel which is disposed on an upper or lower surface of display portion 161, and detects a position designated by a user on the display surface of display portion 161. The user operations of designating touch panel 165 include a multi-touch operation and a single-touch operation. In the multi-touch operation, a user uses a plurality of fingers to designate a plurality of locations on touch panel 165 simultaneously. In the single-touch operation, a user uses one finger to designate one location at a time.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing such as shading compensation on image data received from document reading portion 130 and, on the basis of the processed image data, or on the basis of externally received image data, forms an image on a sheet of paper fed by paper feeding portion 150.

Figure 3:
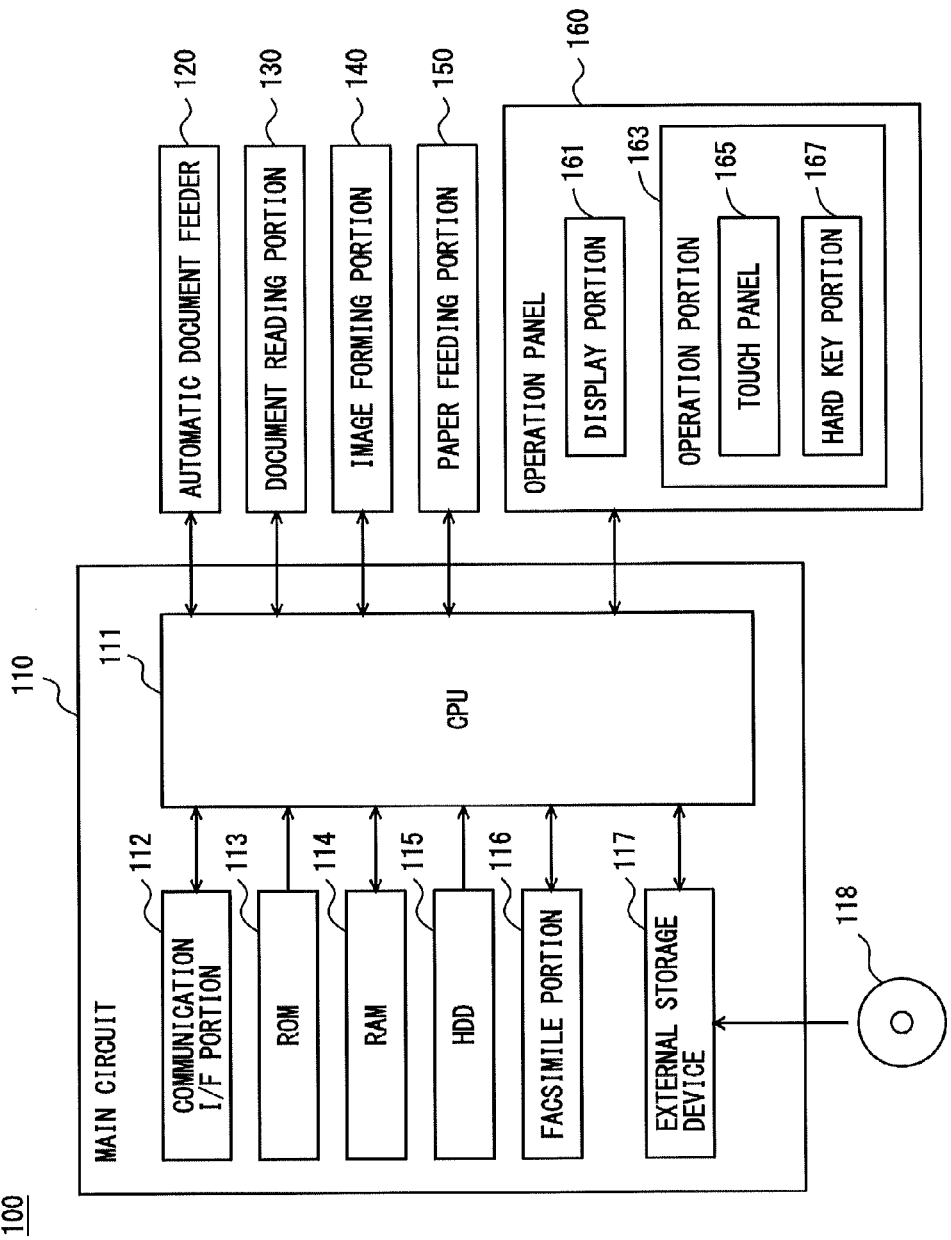
FIG. 3 is a block diagram schematically showing an example of the hardware configuration of the MFP.

FIG. 3 is a block diagram schematically showing an example of the hardware configuration of the MFP. Referring to FIG. 3, MFP 100 includes a main circuit 110. Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

ROM 113 stores a program to be executed by CPU 111 or data necessary for execution of the program. RAM 114 is used as a work area when CPU 111 executes a program. Further, RAM 114 temporarily stores read images continuously transmitted from document reading portion 130.

Facsimile portion 116 is connected to public switched telephone networks (PSTN), and transmits facsimile data to or receives facsimile data from the PSTN. Facsimile portion 116 stores the received facsimile data in HDD 115. Alternatively, facsimile portion 116 converts the data into print data which can be printed in image forming portion 140, and outputs the print data to image forming portion 140, thereby causing image forming portion 140 to form an image on a sheet of paper on the basis of the facsimile data received by facsimile portion 116. Further, facsimile portion 116 converts the data read by document reading portion 130 or the data stored in HDD 115 into facsimile data, and transmits the facsimile data to a facsimile machine connected to the PSTN.

Communication I/F portion 112 is an interface for connecting MFP 100 to a network. Communication I/F portion 112 communicates with another computer connected to the network, using a communication protocol such as the transmission control protocol (TCP) or the file transfer protocol (FTP). It is noted that the protocol for communication is not particularly limited; any protocol can be used. The network to which communication I/F portion 112 is connected is, for example, a local area network (LAN). It may be connected in a wired or wireless manner. The network is not necessarily the LAN; it may be a wide area network (WAN), a network using the public switched telephone networks (PSTN), or the like. Furthermore, the network is connected to the Internet, so that it is possible for MFP 100 to communicate with a computer, such as a server, connected to the Internet.

External storage device 117, which is controlled by CPU 111, is mounted with a compact disc read-only memory (CD-ROM) 118 or a semiconductor memory. CPU 111 is capable of accessing CD-ROM 118 or the semiconductor memory via external storage device 117. CPU 111 loads the program recorded on CD-ROM 118 or the semiconductor memory mounted on external storage device 117, into RAM 114 for execution. It is noted that the program executed by CPU 111 is not restricted to the program recorded on CD-ROM 118 or the semiconductor memory. CPU 111 may load a program stored in HDD 115, into RAM 114 for execution. In this case, via the network to which communication I/F portion 112 is connected, another computer connected to the network may rewrite the program stored in HDD 115 of MFP 100, or additionally write a new program therein. Further, MFP 100 may download a program from another computer connected to the network, and store the program in HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Operation panel 160 includes display portion 161 and an operation portion 163. Display portion 161 is a display such as a liquid crystal display (LCD) or an organic electro-luminescence display (ELD), and displays an instruction menu for a user, information about acquired image data, and so on. Operation portion 163 includes touch panel 165 and hard key portion 167 made up of a plurality of hard keys. The hard keys included in hard key portion 167 each include a contact switch, which is connected to CPU 111. Each hard key, when depressed by an operation user, closes its contact to close a circuit connected to CPU 111. Each hard key closes the circuit while being depressed by an operation user who operates MFP 100, whereas it opens the circuit while not being depressed by the operation user.

When a plurality of keys included in hard key portion 167 are depressed, operation portion 163 accepts input data, such as instructions, characters, and numerical characters, corresponding to the depressed keys. Touch panel 165 is disposed on an upper or lower surface of display portion 161, and outputs the coordinates of a position designated by the operation user to CPU 111. Touch panel 165 detects the position designated by the operation user with his/her finger or a stylus pen, and outputs the coordinates of the detected position to CPU 111. Touch panel 165 is a multi-touch-capable touch panel. When a user inputs a multi-touch operation, touch panel 165 outputs to CPU 111 a plurality of sets of coordinates corresponding respectively to the plurality of positions designated simultaneously by the user. When a user inputs a single-touch operation, touch panel 165 outputs to CPU 111 a set of coordinates corresponding to the single position designated by the user.

Touch panel 165 preferably has a size equal to or greater than that of the display surface of display portion 161. As touch panel 165 is disposed on the surface of display portion 161, when the operation user designates a position on the display surface of display portion 161, touch panel 165 outputs the coordinates of the position that the operation user has designated on the display surface of display portion 161, to CPU 111. Touch panel 165 may be, for example, of a resistive type, a surface acoustic wave type, an infrared ray type, an electromagnetic induction type, or a capacitance type, although it is not limited to these types.

Operations that can be accepted by operation portion 163 include an operation of depressing any of the keys included in hard key portion 167, and a single-touch operation and a multi-touch operation of designating position(s) on touch panel 165. Further, hard key portion 167 includes four hard keys 167A to 167D having the characters "BOX", "FAX", "COPY", and "ECO" respectively displayed thereon. Three hard keys 167A, 167B, and 167C with the characters "BOX", "FAX", and "COPY", respectively, are process switching keys assigned with process switching operations for designating switching of the process to be executed by MFP 100. Hard key 167D with the characters "ECO" is a mode switching key assigned with a mode switching operation for designating switching of the mode of MFP 100 from a normal mode to a power saving mode in which less electricity is consumed. When hard key 167A, 167B, or 167C is depressed, operation portion 163 accepts the corresponding process switching operation. When hard key 167D is depressed, operation portion 163 accepts the mode switching operation.

FIG. 4 shows an example of the software architecture of the CPU included in the MFP. Referring to FIG. 4, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs the process of controlling hardware resources of MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, and operation panel 160. The task belonging to the OS layer controls the hardware resources in accordance with an operating command input from the MFP process layer. Further, the OS layer shares, with the MFP process layer, a plurality of pieces of operation identification information for respectively identifying a plurality of types of operations that can be accepted by operation portion 163 which is one of the hardware resources. When operation portion 163 detects an operation performed by an operation user, the task belonging to the OS layer outputs a piece of operation identification information for identifying the detected operation, to the MFP process layer.

A task for CPU 111 to execute an application program belongs to the application layer. In the case where two or more application programs are installed into MFP 100, two or more tasks of executing the respective application programs may belong to the application layer.

The task of executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task of executing the application program outputs an application command. The application command is a command which has been released as an application program interface (API). This facilitates creation of an application program for causing MFP 100 to perform a process. Releasing something means that a third party other than the manufacturer of MFP 100 can use it. The third party is able to use the application commands to develop an application program that can be installed into MFP 100.

Further, the task of executing the application program specifies a process to be performed, from among the plurality of types of processes determined by the application program, on the basis of an operation input by the operation user who operates MFP 100. The task of executing the application program then performs the specified process. The operation input by the operation user operating MFP 100 is accepted in the OS layer when the operation user operates operation portion 163 to input the operation.

The application PF layer, located between the application layer and the MFP process layer, has belonging thereto a task of arbitrating a plurality of tasks belonging to the application layer and also controlling the application commands output from the plurality of tasks belonging to the application layer. More specifically, the application PF layer accepts application commands output respectively from the tasks belonging to the application layer, converts the accepted application commands into internal commands in accordance with a predetermined rule, for standardization, and outputs the internal commands to the MFP process layer. This can address the case where a plurality of application programs are different in version, or the like. Further, the application PF layer brings one of the tasks belonging to the application layer into a currently selected state. The application PF layer outputs the operation which has been accepted by the OS layer and is input from the task belonging to the MFP process layer, to the task that has been set to the currently selected state from among the tasks belonging to the application layer.

The operations input by a user and accepted in the OS layer include a single-touch operation in which the user uses one finger to designate a position on touch panel 165 and a multi-touch operation in which the user uses two or more fingers to designate positions on touch panel 165 simultaneously. Each of the single-touch operation and the multi-touch operation is detected as a mouse event by the operating system, and is input from the application PF layer into the currently selected task among the tasks belonging to the application layer. Further, one or more mouse events are converted into a gesture event in the MFP process layer, and the gesture event is input from the application PF layer into the currently selected task among the tasks belonging to the application layer. To this end, the application layer shares, with the MFP process layer, one or more gesture events which can be accepted by an application program, and the task of executing the application program receives, from the task belonging to the application PF layer, one or more gesture events acceptable by the application program. The task of executing the application program performs one or more of the plurality of types of processes that correspond(s) to the gesture event(s) or the mouse event(s).

Application commands are associated with internal commands in advance. For example, a commands correspondence table which associates application commands with internal commands may be stored. One application command may correspond to one internal command, or one application command may correspond to a set of two or more internal commands. Further, two or more application commands of different versions may correspond to one internal command or to a set of two or more internal commands. This can address the case where application programs are of different versions. The internal command is a command which depends upon the hardware resource(s) in MFP 100. Internal commands are not released usually, although they may be released.

The MFP process layer, located between the application PF layer and the OS layer, has belonging thereto a task for CPU 111 to execute an MFP process program. The MFP process layer converts an internal command output from a task belonging to the application PF layer, into an operating command which can be interpreted by a task belonging to the OS layer, and outputs the operating command to the task belonging to the OS layer for controlling the hardware resource(s). Although an internal command may actually be converted into one or more operating commands which can be executed by a task belonging to the OS layer, for the convenience sake, it is here assumed that one internal command is converted into one operating command executable by the task belonging to the OS layer.

While the application programs cause MFP 100 to perform the browsing process, copying process, scanning process, printing process, facsimile transmitting/receiving process, data transmitting/receiving process, and so on, the following description will focus on the part related to the process of controlling operation panel 160, among the processes the application programs cause CPU 111 to perform.

FIG. 5 is a block diagram showing, by way of example, the functions of the CPU included in the MFP, together with information stored in the HDD. The functions shown in FIG. 5 are implemented by CPU 111 included in MFP 100 as CPU 111 executes programs stored in ROM 113, HDD 115, or CD-ROM 118. Specifically, the functions are implemented by CPU 111 as CPU 111 executes an OS program, an MFP process program, an operation accepting program, and an application program. Shown here are the functions of CPU 111 implemented when a first application program and a second application program are installed in MFP 100 as the application programs.

Referring to FIG. 5, CPU 111 includes an application portion 51, an arbitration portion 53, an operation converting portion 55, and an operating portion 57. Application portion 51 belongs to the application layer in the software architecture shown in FIG. 4. Application portion 51 includes a browsing portion 61 and a secondary executing portion 63. Browsing portion 61 executes a browsing program which corresponds to the first application program. Secondary executing portion 63 executes the second application program different from the browsing program.

Browsing portion 61 includes a display image generating portion 71, a determining portion 73, a selecting portion 75, and an instructing portion 77. Display image generating portion 71 downloads from a server connected to the Internet a Web page which is content described in a markup language such as hypertext markup language (HTML). Display image generating portion 71 interprets the Web page, generates a display image corresponding to the Web page, and displays at least a part of the display image on display portion 161. The Web page may be a Web page identified by the uniform resource locator (URL) which is designated by an operation user who operates MFP 100, or a Web page identified by the URL predetermined by browsing portion 61.

Specifically, display image generating portion 71 outputs an application command instructing to display on display portion 161 at least a part of a display image corresponding to the Web page, to arbitration portion 53. This causes operating portion 57, which will be described later, to store the display image into a video RAM (VRAM) included in display portion 161, and display at least a part of the display image on display portion 161. The area, within the display image, to be displayed on display portion 161 can be determined arbitrarily. For example, the area to be displayed on display portion 161 may be determined by default, determined by the Web page, or determined on the basis of the sizes of the display image and display portion 161.

Further, when the Web page acquired from the server includes a description for displaying an embedded image which is generated when the second application program different from the browsing program is executed, display image generating portion 71 outputs a start-up instruction to secondary executing portion 63. This causes secondary executing portion 63 to be formed in CPU 111. When the Web page includes a description for displaying an embedded image, display image generating portion 71 refrains from arranging any image in the embedded area, determined by the Web page, in the display image. The embedded area is an area within a display image in which an embedded image is to be arranged.

The start-up instruction includes positional information indicating the position of an embedded area in a display image. The start-up instruction may also include content identification information for specifying embedded content which is different from the Web page. The content identification information is, for example, a network address, preferably a URL.

Secondary executing portion 63 is started in response to input of a start-up instruction from display image generating portion 71. Secondary executing portion 63 executes a program which is described in an object-oriented programming language such as Java (registered trademark), JavaScript (registered trademark), or the like. Secondary executing portion 63 may execute a second application program different from the browsing program, or may cause a server, which is an external computer connected via a network, to execute the second application program different from the browsing program.

In the case where secondary executing portion 63 causes a server, connected to the network, to execute the second application program, secondary executing portion 63 may or may not be included in browsing portion 61. The case where secondary executing portion 63 is included in browsing portion 61 corresponds, for example, to the case where secondary executing portion 63 executes an application program described in JavaScript (registered trademark). In this case, the application program described in JavaScript (registered trademark) is described within the browsing program which is the first application program. The case where secondary executing portion 63 is not included in browsing portion 61 corresponds, for example, to the case where secondary executing portion 63 executes an application program described in Java (registered trademark). In this case, the application program described in Java (registered trademark) is a program different from the browsing program which is the first application program.

Secondary executing portion 63 acquires an image of content which is determined by the second application program executed by the server, as an embedded image. Specifically, secondary executing portion 63 transmits to the server a processing request for causing the server to perform a process predetermined by the second application program. When secondary executing portion 63 receives from the server an image that the server has generated by performing the process in accordance with the processing request, secondary executing portion 63 acquires the received image as the embedded image. In the case where the content to be displayed is determined by the server, there is no need for the processing request to include content identification information. Alternatively, the content may be specified in the Web page, in which case secondary executing portion 63 may transmit to the server a processing request including the content identification information included in the start-up instruction, to cause the server to process the content specified by the content identification information and return an image of the content to secondary executing portion 63. It is noted that the server which secondary executing portion 63 causes to perform the processing may or may not be the same as the server from which browsing portion 61 has downloaded the Web page.

In the case where secondary executing portion 63 executes a second application program different from the browsing program, the second application program is an application program that is different from the browsing program, which is, for example, a reproducing program for generating a still image or a moving image which is the content. In this case, secondary executing portion 63 executes the reproducing program which is the second application program, and causes CPU 111 to perform the process of reproducing an image of the content specified by the content identification information included in the start-up instruction.

Secondary executing portion 63 displays on display portion 161, as an embedded image, an image of the content that has been received from the server, or an image of the content that has been generated as the second application program has been executed. Specifically, secondary executing portion 63 outputs an application command to arbitration portion 53 so as to cause the embedded image to be arranged in an embedded area in a display image. Further, secondary executing portion 63 outputs a display request to browsing portion 61. As a result, the embedded image is stored, by operating portion 57 which will be described later, into the embedded area within the display image which is stored in the VRAM included in display portion 161. The application command includes the positional information included in the start-up instruction.

It is noted that the application programs executed by browsing portion 61 and secondary executing portion 63 are not limited to those described above. The application program may be a program for customizing a user interface and the like for causing MFP 100 to perform the copying process, scanning process, printing process, facsimile transmitting/receiving process, data transmitting/receiving process, and so on.

Arbitration portion 53 and operation converting portion 55 are functions implemented by tasks for CPU 111 to execute an operation accepting program. Arbitration portion 53 belongs to the application PF layer in the software architecture shown in FIG. 4. Operation converting portion 55 also belongs to the application PF layer in the software architecture shown in FIG. 4. While it is here assumed that all the functions of operation converting portion 55 belong to the application PF layer, it may be configured such that at least some of the functions of operation converting portion 55 belong to the application PF layer and the rest belong to the MFP process layer.

In the case where there are a plurality of tasks of executing application programs in application portion 51, arbitration portion 53 brings one of the plurality of tasks into a currently selected state. Hereinafter, the task that has been set in the currently selected state by arbitration portion 53 will be referred to as "current task". In the present embodiment, application portion 51 includes browsing portion 61 and secondary executing portion 63, and secondary executing portion 63 is started by browsing portion 61. Therefore, arbitration portion 53 determines browsing portion 61 to be the current task.

Arbitration portion 53 receives an application command output from each of browsing portion 61 and secondary executing portion 63, and outputs the application command and application identification information for identifying the task that has output the application command, to operation converting portion 55.

In the case where a plurality of application commands are output from browsing portion 61 and secondary executing portion 63, arbitration portion 53 determines the order of the application commands, and sequentially outputs them in the determined order to operation converting portion 55. For example, in the case where a plurality of application commands cannot be executed at the same time, arbitration portion 53 waits until operation converting portion 55 finishes the execution of one application command before arbitration portion 53 outputs another application command to operation converting portion 55. In the case where one application command can be executed only after the execution of another application command is finished, even if the one application command is input earlier than the other application command, arbitration portion 53 outputs the other application command first.

Operation converting portion 55 receives an application command from arbitration portion 53, and converts the application command, in accordance with a commands correspondence table, into an internal command for standardization. The commands correspondence table associates one application command with one or more internal commands. The application commands included in the commands correspondence table may include the application commands of the same type but of different versions. In such a case, each of the application commands of different versions is associated with one or more internal commands. This enables installation of application programs having application commands of different versions described therein. When a new application command appears, the commands correspondence table is updated with a commands correspondence table in which the new application command is associated with one or more internal commands. This enables installation of an application program having the new application command described therein.

Further, operation converting portion 55 converts the standardized internal command into an operating command, and outputs the operating command to operating portion 57. The operating command is a command that has been predetermined between operation converting portion 55 and operating portion 57 and that can be interpreted by operating portion 57.

Operating portion 57 is a function implemented by a task for CPU 111 to execute an OS program. Operating portion 57 belongs to the OS layer in the software architecture shown in FIG. 4.

Operating portion 57 receives an operating command output from operation converting portion 55, and controls hardware resources in accordance with the operating command. Here, display portion 161, touch panel 165 in operation portion 163, and HDD 115 will be described as examples of the hardware resources. Operating portion 57 controls display portion 161 to cause it to display an image. Further, operating portion 57 controls HDD 115 to cause it to store data, and also reads data stored in HDD 115. Furthermore, operating portion 57 causes touch panel 165 to detect a position designated by a user, at a prescribed time interval, and acquires positional information from touch panel 165 at a prescribed time interval.

When an operation user designates a position on the display surface of display portion 161, touch panel 165 detects the position designated by the operation user, and outputs the positional information indicating the position on the display surface of display portion 161, to CPU 111. When operating portion 57 receives positional information from touch panel 165, operating portion 57 outputs the positional information to operation converting portion 55. Operating portion 57 may receive two or more pieces of positional information simultaneously from touch panel 165. For example, when an operation user uses two fingers to designate two different positions on the display surface of display portion 161 simultaneously, operating portion 57 accepts two pieces of positional information which respectively indicate the two positions designated on the display surface. When operating portion 57 accepts two or more pieces of positional information simultaneously from touch panel 165, operating portion 57 outputs the two or more pieces of positional information to operation converting portion 55.

Operation converting portion 55 includes an association portion 81, a gesture event determining portion 83, a mouse event generating portion 85, and a display control portion 87.

At the stage when a browsing program is installed, association portion 81 associates each of a plurality of types of processes determined by the browsing program with one of a plurality of gesture events. Specifically, association portion 81 generates a master table in which a plurality of pieces of process identification information respectively identifying the plurality of types of processes determined by the browsing program are associated with corresponding ones of gesture events acceptable by the browsing program, and stores the generated master table into HDD 115.

FIG. 6 shows an example of a master table. Referring to FIG. 6, master table 91 includes a master record for each of a plurality of pieces of process identification information. Each master record includes a "process" field and a "gesture" field. In the "process" field, process identification information is set. In the "gesture" field, gesture identification information for identifying a gesture event is set.

For example, the master record with the process identification information "Page Turning" set in the "process" field has the gesture identification information "Swipe" set in the "gesture" field. The process specified by the process identification information "Page Turning" is the process of changing the screen to a next page. The gesture event specified by the gesture identification information "Swipe" corresponds to the user operation of moving a finger, while designating a position on touch panel 165, to the left, right, up, or down at a speed equal to or higher than a prescribed speed. As the direction of moving a finger is determined during the operation of moving the finger at a speed equal to or higher than a prescribed speed, the gesture event specified by the gesture identification information "Swipe" includes the direction of moving the finger as a parameter.

The master record with the process identification information "Enlargement" set in the "process" field has the gesture identification information "Pinch Out" set in the "gesture" field. The process specified by the process identification information "Enlargement" is the process of zooming in on the screen. The gesture event specified by the gesture identification information "Pinch Out" corresponds to the user operation of moving at least one of the two locations designated on touch panel 165 such that the spacing between the two locations increases. As the spacing between the two locations is changed during the operation of moving the finger(s) to increase the spacing between the two locations, the gesture event specified by the gesture identification information "Pinch Out" includes, as a parameter, a scaling factor indicating the rate of change of the spacing between the two locations.

The master record with the process identification information "Reduction" set in the "process" field has the gesture identification information "Pinch In" set in the "gesture" field. The process specified by the process identification information "Reduction" is the process of zooming out on the screen. The gesture event specified by the gesture identification information "Pinch In" corresponds to the user operation of moving at least one of the two locations designated on touch panel 165 such that the spacing between the two locations decreases. As the spacing between the two locations is changed during the operation of moving the finger(s) to decrease the spacing between the two locations, the gesture event specified by the gesture identification information "Pinch In" includes, as a parameter, a scaling factor indicating the rate of change of the spacing between the two locations.

The master record with the process identification information "Rotation" set in the "process" field has the gesture identification information "Rotation" set in the "gesture" field. The process specified by the process identification information "Rotation" is the process of rotating a screen to change the direction of the screen. The gesture event specified by the gesture identification information "Rotation" is detected when the user operation of moving at least one of the two locations designated on touch panel 165 such that the direction of the straight line connecting the two locations is changed is input. For example, a user may input an operation of drawing an arc with one finger about the location designated by the other finger. As the direction in which the arc is drawn is clockwise or counterclockwise, the gesture event specified by the gesture identification information "Rotation" includes either the clockwise direction or the counterclockwise direction as a parameter.

The master record with the process identification information "Scroll" set in the "process" field has the gesture identification information "Flick" set in the "gesture" field. The process specified by the process identification information "Scroll" is the process of scrolling a screen to the left, right, up, or down. The gesture event specified by the gesture identification information "Flick" corresponds to the user operation of moving a finger, while designating a position on touch panel 165, to the left, right, up, or down at a speed lower than the threshold value that is also used for determination of the user operation corresponding to the gesture event identified by the gesture identification information "Swipe". As the direction of moving a finger is determined during the operation of moving the finger at a speed lower than the threshold value, the gesture event specified by the gesture identification information "Flick" includes the direction of moving the finger as a parameter.

The master record with the process identification information "Select Content" set in the "process" field has the gesture identification information "Double Tap" set in the "gesture" field. The process specified by the process identification information "Select Content" is the process of selecting content.

Returning to FIG. 5, display control portion 87 converts application commands input from browsing portion 61 or secondary executing portion 63, into operating commands for causing display portion 161 to display an image, and outputs the operating commands to operating portion 57. This causes a display image generated by browsing portion 61 and an embedded image generated by secondary executing portion 63 to be stored into the VRAM in display portion 161, and at least a part of the display image to be displayed on display portion 161.

Mouse event generating portion 85 generates a mouse event in response to input of positional information from operating portion 57. Further, each time mouse event generating portion 85 generates a mouse event, it outputs the generated mouse event to gesture event determining portion 83, and to browsing portion 61 via arbitration portion 53. When mouse event generating portion 85 receives a plurality of pieces of positional information simultaneously from operating portion 57, mouse event generating portion 85 generates a plurality of mouse events corresponding respectively to the pieces of positional information. In the case where mouse event generating portion 85 generates one or more mouse events, it outputs the generated one or more mouse events to gesture event determining portion 83 and browsing portion 61. The positional information indicates a position on the display surface of display portion 161, designated by an operation user.

The operations by which an operation user designates a position on the display surface of display portion 161 include: a designation starting operation by which a user designates an arbitrary position on the display surface of display portion 161; a move operation by which the user moves the designated position while designating (or, touching) the display surface of display portion 161; and an exit operation by which the user terminates the designation performed on the display surface of display portion 161. When mouse event generating portion 85 receives positional information from operating portion 57, mouse event generating portion 85 determines whether the operation performed by the operation user is the designation starting operation, the move operation, or the exit operation. As stated above, each time the positional information is output from touch panel 165, operating portion 57 outputs the positional information. Therefore, mouse event generating portion 85 determines whether the operation performed by the operation user is the designation starting operation, the move operation, or the exit operation, on the basis of the continuity of the pieces of positional information which are input continuously over time.

When mouse event generating portion 85 receives positional information from operating portion 57 after no positional information has been received therefrom for a prescribed period of time, mouse event generating portion 85 determines, for the received positional information, that the operation user has performed the designation starting operation. Then, mouse event generating portion 85 generates a mouse event including the positional information and state identification information "Press" for identifying the designation starting operation.

Following the detection of the mouse event whose state identification information is "Press", when mouse event generating portion 85 receives one or more pieces of positional information continuously from operating portion 57, mouse event generating portion 85 determines, for each of the received pieces of positional information, that the operation user has performed the move operation. Then, for each of the one or more pieces of positional information input continuously from operating portion 57, mouse event generating portion 85 generates a mouse event including the positional information and state identification information "Move" for identifying the move operation.

Following the detection of the mouse event whose state identification information is "Move", when mouse event generating portion 85 no longer receives positional information from operating portion 57, mouse event generating portion 85 determines, for the lastly received positional information, that the operation user has performed the exit operation. Then, mouse event generating portion 85 generates a mouse event including the lastly received positional information and state identification information "Release" for identifying the exit operation.

More specifically, mouse event generating portion 85 determines the state of a mouse event on the basis of the positional information that is input from operating portion 57 at a first time and the positional information that is input from operating portion 57 at a second time which is a prescribed time after the first time. In the case where positional information is input at the first time but no positional information indicating a position within the range of a prescribed distance from the position specified by the positional information input at the first time was input a prescribed time before the first time, then mouse event generating portion 85 determines the state of the mouse event for the positional information input at the first time to be "Press". In the case where the position specified by the positional information input at the first time does not fall within the range of a prescribed distance from the position specified by the positional information input at the second time, then mouse event generating portion 85 determines the state of the mouse event for the positional information input at the second time to be "Press".

Further, in the case where the position specified by the positional information input at the first time falls within the range of a prescribed distance from the position specified by the positional information input at the second time, then mouse event generating portion 85 determines the state of the mouse event for the positional information input at the second time to be "Move". Further, in the case where no positional information indicating a position within the range of a prescribed distance from the position specified by the positional information input at the first time is input at the second time, then mouse event generating portion 85 determines, at the second time, the state of the mouse event for the positional information that was input at the first time to be "Release".

Gesture event determining portion 83 determines a gesture event on the basis of a plurality of mouse events continuously input from mouse event generating portion 85. In the case where mouse events are continuously input one at a time from mouse event generating portion 85, gesture event determining portion 83 specifies a second mouse event which is input a prescribed time after the first mouse event was input. Then, in the case where the distance between the position specified by the first mouse event and the position specified by the second mouse event is equal to or greater than a prescribed distance, gesture event determining portion 83 determines a gesture event, whereas when the distance between the two positions is smaller than the prescribed distance, gesture event determining portion 83 refrains from determining a gesture event. The prescribed time may be determined arbitrarily. For example, the prescribed time can be set to several times the interval of detection of positions by touch panel 165. The prescribed distance may also be determined arbitrarily, although it is preferably set to 40 pixels, for example.

In the case where two or more mouse events are simultaneously input from mouse event generating portion 85, gesture event determining portion 83 determines a gesture event on the basis of the two or more mouse events. Therefore, when a user inputs a multi-touch operation, gesture event determining portion 83 determines a gesture event. Specifically, in the case where a first mouse event and a second mouse event are input simultaneously from mouse event generating portion 85, gesture event determining portion 83 determines a gesture event on the basis of a first set of a plurality of mouse events which are continuously input in relation to the first mouse event, and a second set of a plurality of mouse events which are continuously input in relation to the second mouse event. The mouse events included in the first set have their positional information identical to or continuous with one another. Here, being "continuous" means that two pieces of positional information indicate positions adjacent to each other. The mouse events included in the second set have their positional information identical to or continuous with one another. Therefore, gesture event determining portion 83 refers to the positional information included in each of the simultaneously input mouse events, to determine whether the mouse event belongs to the first set or the second set.

When gesture event determining portion 83 receives mouse events continuously from mouse event generating portion 85, the state identification information of the firstly input mouse event is "Press". Then, when gesture event determining portion 83 receives a mouse event whose state identification information is "Move", gesture event determining portion 83 calculates a distance between the two points, on the basis of the positional information included in the mouse event whose state identification information is "Press" and the positional information included in the mouse event whose state identification information is "Move", and detects a user's swipe operation if the distance is a prescribed threshold value TH or greater, while it detects a user's flick operation if the distance is smaller than the prescribed threshold value TH. When a plurality of mouse events are input, a user's swipe operation may be detected by earlier mouse events and a user's flick operation may be detected by later mouse events. When gesture event determining portion 83 detects a swipe operation or a flick operation, it calculates a direction from the position specified by the positional information included in the preceding mouse event toward the position specified by the positional information included in the succeeding mouse event, determines one of the left, right, top, and down directions relative to the display surface of display portion 161 that is closest to the calculated direction, as a parameter, and determines a gesture event including the parameter. When gesture event determining portion 83 detects a swipe operation, it determines a gesture event which includes the gesture identification information "Swipe" for identifying the gesture event and a parameter indicating a direction. When gesture event determining portion 83 detects a flick operation, it determines a gesture event which includes the gesture identification information "Flick" and a parameter indicating a direction.

In the case where gesture event determining portion 83 receives two mouse events simultaneously from mouse event generating portion 85, the state of each of the firstly input two mouse events is "Press". In this case, gesture event determining portion 83 calculates, on the basis of the positional information included in the respective mouse events, a distance L1 between the two points and an angle R1 of a straight line connecting the two points. The angle of the straight line connecting the two points may be an angle between the straight line and a reference line extending in a lateral direction of display portion 161. The angle between the reference line and the straight line connecting the two points is calculated clockwise from the reference line. Then, as two mouse events are subsequently input continuously, gesture event determining portion 83 calculates, on the basis of the positional information included in the subsequently input two mouse events, a distance L2 between the two points and an angle R2 of a straight line connecting the two points.

In the case where the angle R1 and the angle R2 are the same and the distance L2 is different from the distance L1, then gesture event determining portion 83 detects a pinch-out operation or a pinch-in operation by a user. Here, the determination that the angle R1 and the angle R2 are the same means that the difference between the angle R1 and the angle R2 is within a prescribed range. A certain margin of error is set for detecting the motions of the user fingers. If the distance L2 is greater than the distance L1, gesture event determining portion 83 detects a pinch-out operation. If the distance L2 is smaller than the distance L1, gesture event determining portion 83 detects a pinch-in operation. When detecting a pinch-out or pinch-in operation, gesture event determining portion 83 calculates a scaling factor by dividing the distance L2 by the distance L1, determines the calculated scaling factor as a parameter, and determines a gesture event including the parameter. When gesture event determining portion 83 detects a pinch-out operation, it determines a gesture event including the gesture identification information "Pinch Out" and a parameter indicating a scaling factor. When gesture event determining portion 83 detects a pinch-in operation, it determines a gesture event including the gesture identification information "Pinch In" and a parameter indicating a scaling factor.

In the case where the angle R1 and the angle R2 are different from each other, gesture event determining portion 83 detects a rotation operation by a user. Here, the determination that the angle R1 and the angle R2 are different from each other means that the difference between the angle R1 and the angle R2 is outside the prescribed range. A certain margin of error is set for detecting the motions of the user fingers. When detecting a rotation operation, gesture event determining portion 83 determines the direction of rotation by subtracting the angle R1 from the angle R2, determines the determined rotational direction as a parameter, and determines a gesture event including the parameter. If the value obtained by subtracting the angle R1 from the angle R2 is positive, the rotational direction is clockwise. If the value is negative, the rotational direction is counterclockwise. Gesture event determining portion 83 determines a gesture event including the gesture identification information "Rotation" and a parameter indicating a direction of rotation.

When gesture event determining portion 83 determines a gesture event, gesture event determining portion 83 reads, from HDD 115, master table 91 corresponding to the application identification information of the current task which has been set by arbitration portion 53. Specifically, gesture event determining portion 83 outputs an operating command instructing to read master table 91 to operating portion 57, and acquires master table 91 that operating portion 57 reads by controlling HDD 115. In the following description, it is assumed that browsing program 61 is the current task.

In response to determination of a gesture event, gesture event determining portion 83 specifies, from among a plurality of types of processes determined in master table 91, a process that is associated with the gesture event in correspondence with the application program being set in the currently selected state by arbitration portion 53. Here, as browsing portion 61 has been set as the current task by arbitration portion 53, gesture event determining portion 83 specifies the process that is associated with the gesture event by master table 91 for the browsing program, as shown in FIG. 6. More specifically, gesture event determining portion 83 extracts, from master table 91, a master record in which the gesture identification information included in the determined gesture event is set in the "gesture" field, and acquires the process identification information that is set in the "process" field in the extracted master record. When the process identification information is acquired, gesture event determining portion 83 outputs the determined gesture event to arbitration portion 53. When no process identification information is acquired, gesture event determining portion 83 refrains from outputting the determined gesture event to arbitration portion 53. Further, in the case where gesture event determining portion 83 continuously receives mouse events, one at a time, from mouse event generating portion 85 but determines no gesture event, gesture event determining portion 83 outputs a non-determination signal indicating that no gesture event is determined, to arbitration portion 53.

Gesture event determining portion 83 outputs, to arbitration portion 53, only the gesture event corresponding to the process that can be executed by browsing portion 61 which has been set in the currently selected state by arbitration portion 53. Arbitration portion 53 outputs the gesture event to browsing portion 61 which is the current task. This makes it possible to cause browsing portion 61, which executes the browsing program, to perform the process corresponding to the gesture event which is the operation input to touch panel 165 and specified by a set of mouse events. In other words, at the stage of program development, a browsing program can be developed without any concern for the gesture events which can be accepted by touch panel 165 in MFP 100. For example, it is possible to develop a browsing program which accepts no rotation operation.

Arbitration portion 53 receives a mouse event from mouse event generating portion 85, receives a gesture event from gesture event determining portion 83, and outputs the mouse event and the gesture event to the current task which is one of a plurality of tasks in application portion 51 for CPU 111 to execute application programs. Here, application portion 51 includes browsing portion 61 and secondary executing portion 63, and secondary executing portion 63 is started by browsing portion 61. Therefore, arbitration portion 53 sets browsing portion 61 in the currently selected state. That is, browsing portion 61 is the current task. When arbitration portion 53 receives a mouse event from mouse event generating portion 85, arbitration portion 53 outputs the mouse event to browsing portion 61. When arbitration portion 53 receives a gesture event from gesture event determining portion 83, arbitration portion 53 outputs the gesture event to browsing portion 61.

Browsing portion 61 receives from arbitration portion 53 the mouse event output from mouse event generating portion 85, and receives from arbitration portion 53 the gesture event output from gesture event determining portion 83. A gesture event is determined from a set of one or more mouse events. Therefore, a gesture event and a set of one or more mouse events which determines the gesture event are generated simultaneously in response to one single-touch operation or one multi-touch operation which is input by an operation user.

Browsing portion 61 specifies a process to be performed, from among a plurality of types of processes determined by the browsing program, in accordance with a single-touch or multi-touch operation according to which a gesture event is determined, among the single-touch or multi-touch operations that are input to touch panel 165 by an operation user who operates MFP 100. Browsing portion 61 then executes the specified process.

The plurality of types of processes performed by browsing portion 61 include processes for changing an image displayed on display portion 161. The processes for changing an image include, for example, a process for changing the image being displayed to an image of other content. In the case where a part of an image is being displayed on display portion 161, the processes for changing an image include: a scroll process and a page turning process for changing the area, in the image, to be displayed on display portion 161; an enlargement process for zooming in on the image; a reduction process for zooming out of the image; and a rotation process for changing the direction of the image.

Further, secondary executing portion 63 performs a process in accordance with a single-touch operation which is input into an embedded area and on the basis of which no gesture event is determined, among the single-touch operations that are input to touch panel 165 by the operation user who operates MFP 100. Specifically, in the case where secondary executing portion 63 executes a second application program different from the browsing program, secondary executing portion 63 determines a process to be performed, from among a plurality of types of processes which are determined by the second application program different from the browsing program, and performs the specified process. In this case, the plurality of types of processes performed by secondary executing portion 63 include processes for changing an image displayed on display portion 161. The processes for changing an image include, for example, a process for changing the image being displayed to an image of other content. In the case where a part of an image is being displayed on display portion 161, the processes for changing an image include: a scroll process and a page turning process for changing the area, in the image, to be displayed on display portion 161; an enlargement process for zooming in on the image; a reduction process for zooming out of the image; and a rotation process for changing the direction of the image.

Further, in the case where secondary executing portion 63 causes a server, which is an external computer connected via the network, to execute the second application program different from the browsing program, secondary executing portion 63 transmits a processing request including the mouse event corresponding to the single-touch operation, to the server.

Selecting portion 75 included in browsing portion 61 selects a mouse event or a gesture event. When selecting portion 75 selects the mouse event, it outputs the mouse event to instructing portion 77. When selecting portion 75 selects the gesture event, it outputs the gesture event to determining portion 73.

In the case where selecting portion 75 receives a gesture event, selecting portion 75 has received, before the reception of the gesture event, one or more mouse events on the basis of which the gesture event has been determined. Selecting portion 75 temporarily stores a mouse event which is input via arbitration portion 53 from mouse event generating portion 85, until a gesture event is input via arbitration portion 53 from gesture event determining portion 83, or until a signal indicating that no gesture event is determined is input via arbitration portion 53 from gesture event determining portion 83. Selecting portion 75 may receive one mouse event at a time from arbitration portion 53, or may receive two mouse events simultaneously therefrom. When a user inputs a single-touch operation, one mouse event is received. When a user inputs a multi-touch operation, a plurality of mouse events are received.

<In the Case of Single-Touch Operation>

When selecting portion 75 receives a mouse event from arbitration portion 53, selecting portion 75 determines whether the position indicated by the positional information included in the mouse event falls within an embedded area in the display image generated by display image generating portion 71. When the position indicated by the positional information included in the mouse event falls within the embedded area and when a signal indicating that no gesture event is determined is received via arbitration portion 53 from gesture event determining portion 83, then selecting portion 75 selects the mouse event. When the position indicated by the positional information included in the mouse event falls within the embedded area and when a gesture event is received via arbitration portion 53 from gesture event determining portion 83, if the gesture event is of a prescribed type, selecting portion 75 refrains from selecting the mouse event, whereas if the gesture event is not of the prescribed type, selecting portion 75 selects the mouse event.

Further, when the position indicated by the positional information included in the mouse event falls out of the embedded area, selecting portion 75 refrains from selecting the mouse event.

Further, when the position indicated by the positional information included in the mouse event is outside the embedded area, selecting portion 75 selects a gesture event. When the position indicated by the positional information included in the mouse event falls within the embedded area and when a gesture event is received via arbitration portion 53 from gesture event determining portion 83, if the gesture event is of a prescribed type, selecting portion 75 selects the gesture event, whereas if the gesture event is not of the prescribed type, selecting portion 75 refrains from selecting the gesture event. The prescribed types of gesture events are predetermined by the browsing program. In the present embodiment, the gesture events acceptable by the browsing program include, as shown in master table 91 in FIG. 6, "Swipe", "Pinch Out", "Pinch In", "Rotation", "Flick", and "Double Tap". The prescribed types of gesture events can be determined arbitrarily from among the gesture events acceptable by the browsing program. For example, "Swipe", "Pinch Out", "Pinch In", "Rotation", and "Flick" can be determined as the prescribed types of gesture events. In this case, "Double Tap" is not the gesture event of the prescribed type.

<In the Case of Multi-Touch Operation>

When selecting portion 75 receives a plurality of mouse events simultaneously from arbitration portion 53, selecting portion 75 selects no mouse event. Further, when a plurality of mouse events are received simultaneously, if a gesture event is received via arbitration portion 53 from gesture event determining portion 83, selecting portion 75 selects the gesture event, irrespective of the positions indicated by the pieces of positional information included in the respective mouse events. In other words, when the position indicated by the positional information included in each mouse event falls out of the embedded area, selecting portion 75 refrains from selecting the mouse events.

Further, when the position indicated by the positional information included in each mouse event is outside the embedded area, selecting portion 75 selects a gesture event. When the position indicated by the positional information included in each mouse event falls within the embedded area and when a gesture event is received via arbitration portion 53 from gesture event determining portion 83, if the gesture event is of a prescribed type, selecting portion 75 selects the gesture event, whereas if the gesture event is not of the prescribed type, selecting portion 75 refrains from selecting the gesture event.

When instructing portion 77 receives a mouse event from selecting portion 75, instructing portion 77 outputs the mouse event to secondary executing portion 63. In the case where secondary executing portion 63 causes a server, which is an external computer connected via the network, to execute a second application program different from the browsing program, in response to input of the mouse event from instructing portion 77, secondary executing portion 63 transmits a processing request including the mouse event to the server, and updates the embedded image with an image received from the server. Specifically, secondary executing portion 63 outputs to display control portion 87 an application command instructing to overwrite the VRAM included in display portion 161 with the image received from the server. This causes the embedded area in the display image being stored in the VRAM in display portion 161, to be overwritten with the image received from the server.

Further, in the case where secondary executing portion 63 executes the second application program different from the browsing program, secondary executing portion 63 specifies a process to be performed, from among a plurality of types of processes determined by the second application program, on the basis of the received mouse event. Secondary executing portion 63 then performs the specified process. For example, when the position specified by the positional information included in the mouse event falls within an image of a button included in the embedded area, secondary executing portion 63 specifies a process that is associated with the image of the button. For example, if the position falls within an image of a zoom-in button, secondary executing portion 63 performs a process of zooming in on the image, and updates the embedded image with the zoomed image. Specifically, secondary executing portion 63 outputs to display control portion 87 an application command instructing to overwrite the VRAM included in display portion 161 with the updated image. This causes the embedded area in the display image being stored in the VRAM in display portion 161, to be overwritten with the updated image.

When determining portion 73 receives a gesture event from selecting portion 75, determining portion 73 performs a process of the type corresponding to the gesture event, among a plurality of types of processes determined by the browsing program. Specifically, determining portion 73 determines, from a display image, a display area to be displayed on display portion 161. Determining portion 73 outputs an application command for causing the determined display area to be displayed on display portion 161, to display control portion 87. This causes an image of the area that has been determined by determining portion 73 from within the display image stored in the VRAM in display portion 161, to be displayed on display portion 161. For example, in the case where the gesture event input from selecting portion 75 includes the process identification information "Scroll", an area within the display image obtained by sliding the area that has been displayed on display portion 161 to the left, right, up, or down, is displayed on display portion 161.

A description will now be made of an exemplary flow of user operations and processes performed by MFP 100 of the present embodiment, by taking as an example the case where MFP 100 downloads a Web page from a server 300 connected to the Internet and displays a display image which is an image of the Web page.

Figure 7:
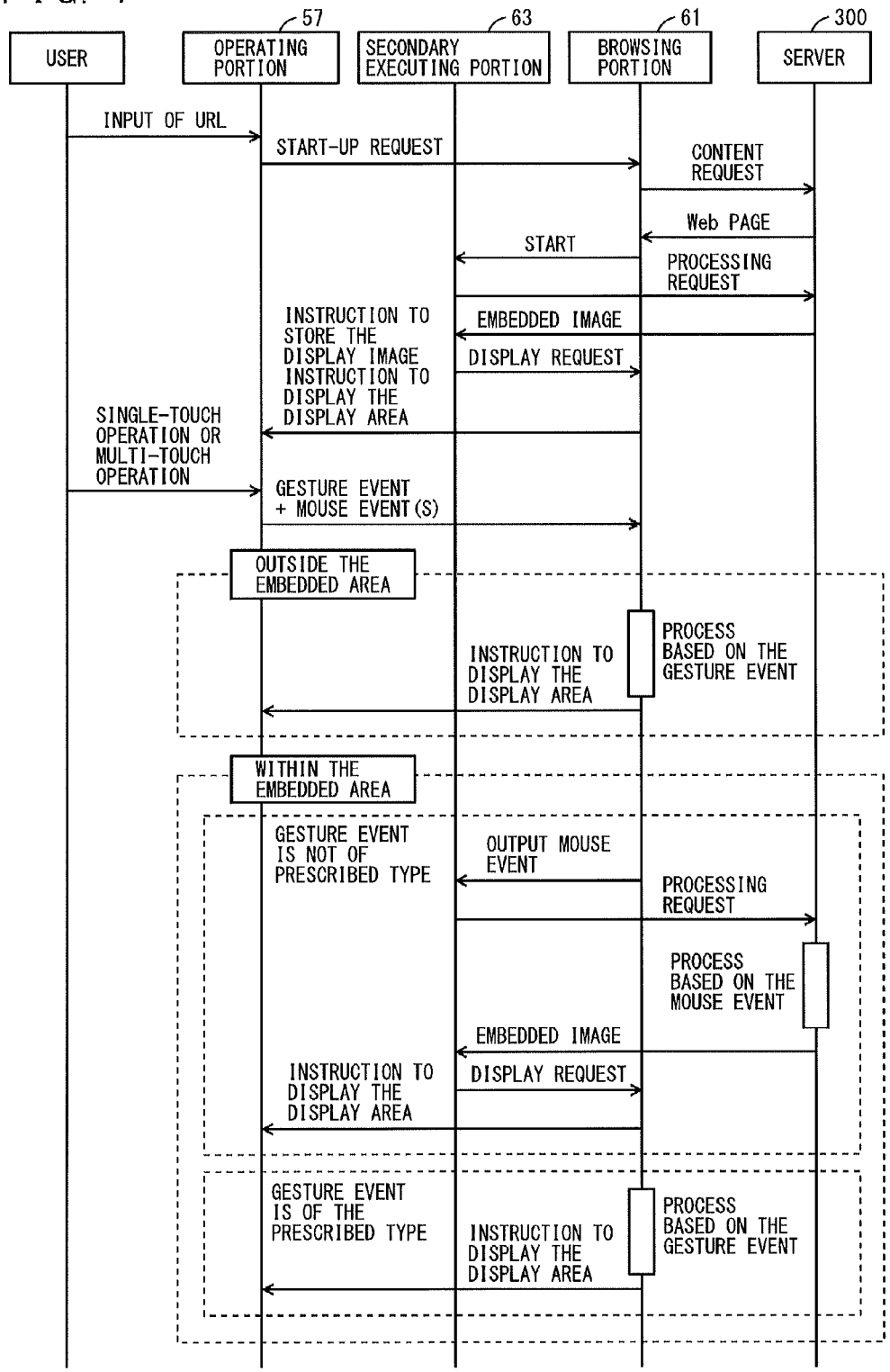
FIG. 7 is a flowchart illustrating an example of the flow of operations performed by a user and processing performed by the MFP.

FIG. 7 is a flowchart illustrating an example of the flow of the operations by a user and processes performed by the MFP. Referring to FIG. 7, axes are shown, starting from the left, for the operations by a user, processes by operating portion 57, processes by secondary executing portion 63, processes by browsing portion 61, and processes by server 300, and time flows from the top downward at each axis.

First, when a user inputs an operation to start a browsing program, operating portion 57 accepts the operation. It is here assumed that a URL of a Web page stored in server 300 is designated by the user at the same time. In accordance with the user operation, operating portion 57 causes CPU 111 to execute the browsing program, whereby browsing portion 61 which is the task for CPU 111 to execute the browsing program is started. Further, operating portion 57 outputs the URL input by the user, to browsing portion 61.

Browsing portion 61 transmits a content request to server 300. The content request is a request to server 300, specified by the URL received from operating portion 57, for transmission of the Web page specified by the URL. When server 300 receives the content request, server 300 returns the Web page specified by the URL, so that browsing portion 61 receives the Web page from server 300. Browsing portion 61 analyzes the Web page, generates a display image corresponding to the Web page, and outputs an instruction to store the display image into the VRAM and an instruction to display the display area, to operating portion 57. In response thereto, operating portion 57 stores the display image into the VRAM included in display portion 161, and displays the display area on display portion 161.

It is here assumed that the Web page includes a description of a command to start a Java (registered trademark) program. Browsing portion 61 thus causes CPU 111 to execute the Java (registered trademark) program, so that secondary executing portion 63, which is the task for CPU 111 to execute the Java (registered trademark) program, is started.

Here, it is also assumed that a process for causing server 300 to transmit an image of the content stored therein has been determined by the Java (registered trademark) program. Secondary executing portion 63 transmits to server 300 a processing request which is a request to perform the process of transmitting the image of the content. In response thereto, server 300 returns the image of the content, so that secondary executing portion 63 receives the image of the content, transmitted from server 300, as an embedded image. Further, secondary executing portion 63 stores the embedded image into the VRAM in display portion 161, and outputs a display request to browsing portion 61. In response thereto, operating portion 57 stores the display image into the VRAM in display portion 161. Furthermore, browsing portion 61 outputs to operating portion 57 an instruction to display a display area. Operating portion 57 displays on display portion 161 a display area from within the display image having the embedded image arranged in the embedded area. Therefore, the embedded image is displayed on display portion 161 when the embedded area is included in the display area.

Thereafter, when the user inputs a single-touch operation or a multi-touch operation, operating portion 57 accepts the operation. Operation converting portion 55 generates one or more mouse events corresponding to the single-touch or multi-touch operation, and determines a gesture event on the basis of the one or more mouse events. The mouse event(s) and gesture event are input to browsing portion 61.

The processing performed by browsing portion 61 varies depending upon whether the position indicated by the positional information included in any mouse event falls within the embedded area. In the case where the position indicated by the positional information included in a mouse event falls within the embedded area, the processing performed by browsing portion 61 further varies depending upon whether the gesture event is of the prescribed type. In the case where the gesture event is not of the prescribed type, browsing portion 61 outputs the mouse event to secondary executing portion 63. Secondary executing portion 63 transmits a processing request including the mouse event, to server 300. When server 300 receives the processing request, server 300 performs a process that has been determined by the second application program, which server 300 executes, in correspondence with the position in the embedded image specified by the mouse event included in the processing request, and returns the processed image of the content. For example, in the case where the process of zooming in on an image has been determined by the second application program, server 300 returns an image obtained by zooming in on the image of the content. Secondary executing portion 63 receives the image of the content transmitted from server 300, as the embedded image. Further, secondary executing portion 63 stores the embedded image into the VRAM included in display portion 161, and outputs a display request to browsing portion 61. Correspondingly, operating portion 57 stores the display image into the VRAM included in display portion 161. Further, browsing portion 61 outputs to operating portion 57 an instruction to display a display area. Operating portion 57 displays on display portion 161 a display area from within the display image having the embedded image arranged in the embedded area. Therefore, the embedded image, which has been enlarged by server 300, is displayed on display portion 161 when the embedded area is included in the display area.

In the case where the position indicated by the positional information included in the mouse event falls within the embedded area and when the gesture event is of the prescribed type, browsing portion 61 performs a process based on the gesture event. In this case, browsing portion 61 refrains from outputting the mouse event to secondary executing portion 63. The process based on the gesture event has been determined by the browsing program. For example, if the process based on the gesture event is a downward scroll process, browsing portion 61 outputs to operating portion 57 an instruction to display a display area obtained by moving the display area downward in the display image. Operating portion 57 displays on display portion 161 the display area in the display image. Therefore, the display area which has been moved in the display image is displayed on display portion 161.

On the other hand, in the case where the position indicated by the positional information included in the mouse event falls out of the embedded area, browsing portion 61 performs a process based on the gesture event. In this case, browsing portion 61 refrains from outputting the mouse event to secondary executing portion 63.

Figure 8:
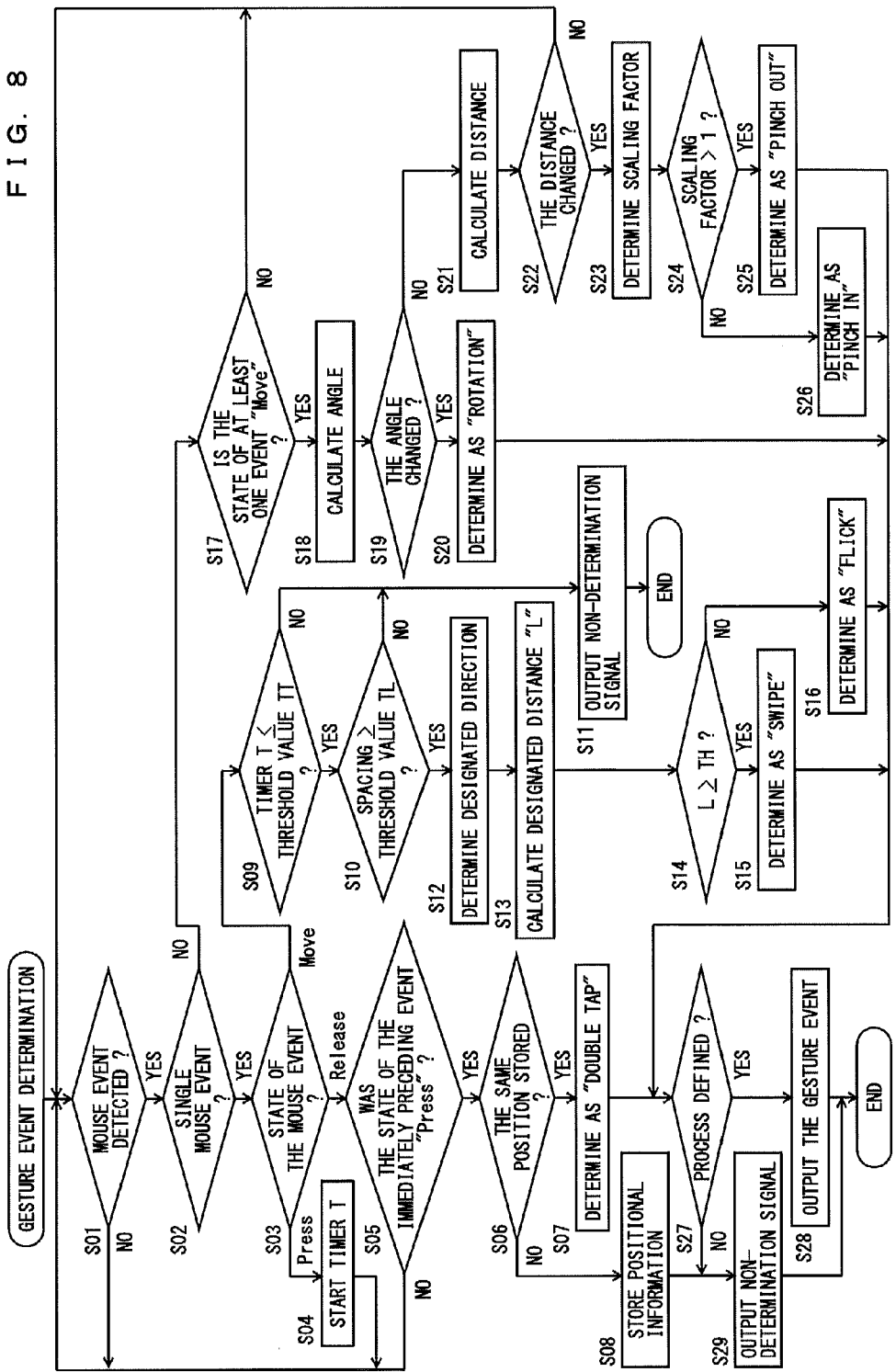
FIG. 8 is a flowchart illustrating an example of the flow of a gesture event determining process.

FIG. 8 is a flowchart illustrating an example of the flow of a gesture event determining process. The gesture event determining process is carried out by CPU 111 included in MFP 100 as CPU 111 executes an operation accepting program stored in ROM 113, HDD 115, or CD-ROM 118. Referring to FIG. 8, CPU 111 determines whether a mouse event has been detected (step S01). If a user designates a position on touch panel 165, a mouse event is detected on the basis of the position detected by touch panel 165. CPU 111 is in a standby mode until a mouse even is detected (NO in step S01), and once a mouse event is detected (YES in step S01), the process proceeds to step S02.

In other words, the gesture event determining process is executed on the condition that a user designates touch panel 165 and a mouse event is detected.

In step S02, CPU 111 determines whether a single mouse event has been detected. If a single mouse event has been detected, the process proceeds to step S03. If more than one mouse event has been detected, the process proceeds to step S17.

In step S03, the process branches in accordance with the state of the mouse event. If the state of the mouse event is "Press", the process proceeds to step S04. If the state of the mouse event is "Move", the process proceeds to step S09. If the state of the mouse event is "Release", the process proceeds to step S05. In step S04, CPU 111 starts a timer T, and the process returns to step S01. Timer T counts time elapsed from the detection of a mouse event whose state is "Press".

In step S09, CPU 111 determines whether a value of timer T is a threshold value TT or less. If so, the process proceeds to step S10; otherwise, the process proceeds to step S11. In step S10, CPU 111 determines whether spacing is a threshold value TL or greater. If so, the process proceeds to step S12; otherwise, the process proceeds to step S11. The spacing is a distance between the position specified by the positional information included in the firstly detected mouse event, i.e. the mouse event whose state is "Press", and the position specified by the positional information included in the mouse event detected in step S01 most recently. In step S11, CPU 111 output a non-determination signal indicating that no gesture event is determined, and the process is terminated. That is, in the case where no mouse event indicating a position at a distance of threshold value TL or greater from the position indicated by the mouse event whose state is "Press" has been detected within the time of threshold value TT from the detection of the mouse event whose state is "Press", the process is terminated with no gesture event determined. This is to prevent any gesture event from being determined in the case where the position designated by a user is not moved within a lapse of time corresponding to the threshold value TT. Alternatively, it may be configured to determine a gesture event that a user designates the same position for a prescribed time.

The process proceeds to step S12 when the state of the mouse event is "Move". This means that another mouse event has been input immediately before the mouse event. The state of the other mouse event may be "Press" or "Move". In step S12, CPU 111 determines a designated direction. Specifically, CPU 111 determines the direction from the position specified by the positional information included in the other mouse event input immediately before, to the position specified by the positional information included in the mouse event detected in step S01. The direction determined here is one of the left, right, up, and down directions relative to the display surface of display portion 161 that is closest to the calculated direction.

In the following step S13, CPU 111 calculates a designated distance L. Specifically, CPU 111 calculates, as the designated distance L, a distance between the position specified by the positional information included in the other mouse event input immediately before, and the position specified by the positional information included in the mouse event detected in step S01. CPU 111 then determines whether the designated distance L is not smaller than a threshold value TH (step S14). If the designated distance L is equal to or greater than the threshold value TH, the process proceeds to step S15; otherwise, the process proceeds to step S16.

In step S15, CPU 111 determines the gesture event to be "Swipe", and the process proceeds to step S27. In step S16, CPU 111 determines the gesture event to be "Flick", and the process proceeds to step S27.

The process proceeds to step S05 when the state of the mouse event detected in step S01 is "Release", in which case another mouse event has been input immediately before the mouse event. The state of the other mouse event may be "Press" or "Move". In step S05, the process branches in accordance with the state of the other mouse event input immediately before. If the state of the other mouse event input immediately before is "Press", the process proceeds to step S06; otherwise, the process returns to step S01.

In step S06, CPU 111 determines whether RAM 114 stores the same positional information as the one included in the mouse event detected in step S01. If so, the process proceeds to step S07; otherwise, the process proceeds to step S08. Here, the determination that the pieces of positional information are the same means that the distance between the two positions specified by the respective pieces of positional information is within a prescribed length. A certain margin of error is set for detecting the user operations of designating the same position.

In step S08, CPU 111 temporarily stores the positional information included in the mouse event detected in step S01, into RAM 114, and the process proceeds to step S29. The process proceeds to step S08 when the state of the mouse event input immediately before is "Press" and the state of the mouse event input subsequently is "Release", and when the same positional information has not been stored in RAM 114. In other words, the process proceeds to step S08 when a user inputs a first tap operation.

In step S07, CPU 111 determines the gesture event to be "Double Tap", and the process proceeds to step S27. The process proceeds to step S07 when the state of the mouse event input immediately before is "Press" and the state of the mouse event detected in step S01 is "Release", and when the same positional information has been stored in RAM 114. In other words, the process proceeds to step S07 when a user, following the first tap operation, taps the same position as the firstly tapped position.

The process proceeds to step S17 in the case where two mouse events are detected. In step S17, CPU 111 determines whether the state of at least one of the two mouse events is "Move". If so, the process proceeds to step S18; otherwise, the process returns to step S01.

In step S18, CPU 111 calculates an angle. Specifically, CPU 111 calculates the angle between the straight line connecting the two positions specified by the respective pieces of positional information included in the two mouse events and a prescribed reference side on the display surface of display portion 161. In the following step S19, CPU 111 determines whether the angle calculated in step S18 has been changed. It is determined that the angle has been changed if the difference between the angle calculated in step S18 and the angle calculated on the basis of another set of two mouse events input immediately before is a prescribed value or greater. If the angle has been changed, the process proceeds to step S20; otherwise, the process proceeds to step S21. In step S20, CPU 111 determines the gesture event to be "Rotation", and the process proceeds to step S27.

In step S21, CPU 111 calculates a distance. Specifically, CPU 111 calculates the distance between the two positions specified by the respective pieces of positional information included in the two mouse events. In the following step S22, CPU 111 determines whether the distance calculated in step S21 has been changed. It is determined that the distance has been changed if the difference between the distance calculated in step S21 and the distance calculated on the basis of the other set of two mouse events input immediately before is a prescribed value or greater. If the distance has been changed, the process proceeds to step S23; otherwise, the process returns to step S01.

In step S23, CPU 111 determines a scaling factor. Specifically, CPU 111 determines the value obtained by dividing the distance calculated in step S21 by the distance calculated on the basis of the other set of two mouse events input immediately before, as the scaling factor. In the following step S24, CPU 111 determines whether the scaling factor is greater than 1. If so, the process proceeds to step S25; otherwise, the process proceeds to step S26.

In step S25, CPU 111 determines the gesture event to be "Pinch Out", and the process proceeds to step S27. In step S26, CPU 111 determines the gesture event to be "Pinch In", and the process proceeds to step S27.

In step S27, CPU 111 determines whether a process corresponding to the determined gesture event has been defined. Specifically, CPU 111 determines whether the plurality of types of processes that have been determined in master table 91 stored in HDD 115 include a process that is associated with the relevant gesture event in correspondence with the application program being set in the currently selected state. If there is a process associated with the determined gesture event in master table 91, CPU 111 determines that a process corresponding to the determined gesture event has been defined for the application program set in the currently selected state. If a process corresponding to the determined gesture event has been defined, the process proceeds to step S28; otherwise, the process proceeds to step S29.

In step S28, CPU 111 outputs the determined gesture event, and the process is terminated. In step S29, CPU 111 outputs a non-determination signal, and the process is terminated.

Figure 9:
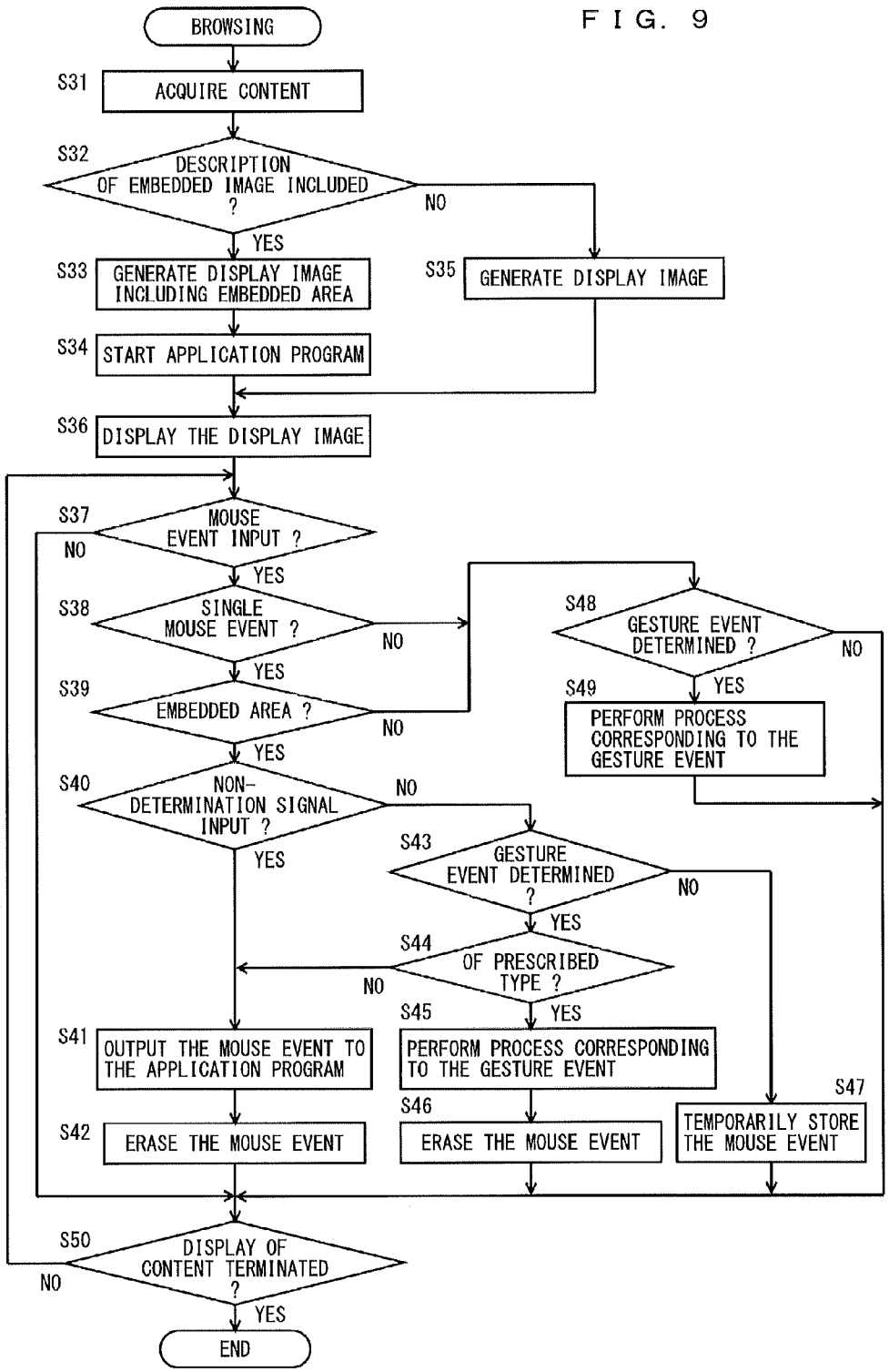
FIG. 9 is a flowchart illustrating an example of the flow of a browsing process.

FIG. 9 is a flowchart illustrating an example of the flow of a browsing process. The browsing process is carried out by CPU 111 included in MFP 100 as CPU 111 executes a browsing program stored in ROM 113, HDD 115, or CD-ROM 118. Referring to FIG. 9, CPU 111 acquires content (step S31). Specifically, CPU 111 downloads a Web page as the content, from a server connected to the Internet. The Web page is identified by a URL designated by an operation user who operates MFP 100. Alternatively, the Web page may be identified by a predetermined URL.

In step S32, CPU 111 determines whether the acquired Web page includes a description of an embedded image. The description of an embedded image refers to a description for displaying an embedded image that is generated as a second application program different from the browsing program is executed. If the Web page acquired from the server includes a description of an embedded image, the process proceeds to step S33; otherwise, the process proceeds to step S35. In step S35, CPU 111 generates a display image in accordance with the description of the Web page, and the process proceeds to step S36. Specifically, CPU 111 stores the display image into the VRAM included in display portion 161.

In step S33, CPU 111 generates a display image including an embedded area. Specifically, CPU 111 stores the display image including the embedded area, into the VRAM included in display portion 161. This causes the display image generated by the task of executing the browsing program to be stored in the VRAM in display portion 161. It is noted that in the embedded area in the display image, nothing is stored by the task of executing the browsing program.

In step S34, CPU 111 starts an application program, and the process proceeds to step S36. In accordance with the description of the Web page, CPU 111 or the server is caused to execute a second application program different from the browsing program, and the task of executing the second application program is caused to generate an embedded image. Specifically, in the case where the second application program is executed by the server in accordance with the JavaScript (registered trademark) described in the Web page, CPU 111 transmits a processing request for requesting the generation of content to the server, and stores the image of the content returned from the server into the embedded area in the display image stored in the VRAM in display portion 161. As a result, in the embedded area in the display image which is stored in the VRAM included in display portion 161, the image that the server has generated by executing the second application program is stored as the embedded image. In the case where the Web page includes an instruction to start a second application program, such as a reproducing program, which can be executed by CPU 111, CPU 111 is caused to execute the second application program. In this case, the image generated by the task for CPU 111 to execute the second application program is stored into the embedded area in the display image stored in the VRAM in display portion 161. As a result, in the embedded area in the display image which is stored in the VRAM included in display portion 161, the embedded image that the task for CPU 111 to execute the second application program has generated is stored.

In this manner, the task of executing the browsing program rewrites the display image, and the embedded area is rewritten with the image generated by the task for CPU 111 or the server to execute the second application program. In other words, the embedded area can be updated with the image generated by the task for the server or CPU 111 to execute the second application program, independently of the task of executing the browsing program.

In step S36, CPU 111 displays the display image. Specifically, CPU 111 displays the display image stored in the VRAM included in display portion 161, on display portion 161. At this time, CPU 111 may display a part of the display image, or it may display the entire display image.

In step S37, CPU 111 determines whether one or more mouse events have been input. If an operation user uses his/her finger(s) to designate one or more positions on the display surface of display portion 161, the designated position(s) is/are detected by touch panel 165, and one or more mouse events each including the corresponding positional information are input. If one or more mouse events have been input (YES in step S37), the process proceeds to step S38; otherwise, the process proceeds to step S50.

In step S38, CPU 111 determines whether a single mouse event has been input. If a single mouse event has been input, the process proceeds to step S39. If more than one mouse event has been input, the process proceeds to step S48. In step S39, CPU 111 determines whether the mouse event is an operation performed on the embedded area. If the position specified by the positional information included in the mouse event falls within the embedded area in the display image, CPU 111 determines that the mouse event is an operation performed on the embedded area. If so, the process proceeds to step S40; otherwise, the process proceeds to step S48.

In step S40, CPU 111 determines whether a non-determination signal has been input. In the above-described gesture event determining process, when it is determined that no gesture event is determined on the basis of the mouse event which has been input in step S37, a non-determination signal is input. If a non-determination signal has been input, the process proceeds to step S41; otherwise, the process proceeds to step S43. In step S41, CPU 111 outputs the mouse event to the task of executing the second application program which has been started in step S34, and the process proceeds to step S42. The mouse event to be output here includes the mouse event which is input in step S37, and the mouse event which is temporarily stored in step S47 which will be described later. In the case of outputting a plurality of mouse events, CPU 111 outputs the mouse events in the same order as they were input. Specifically, in the case where the second application program is executed by the server in accordance with the JavaScript (registered trademark) described in the Web page, CPU 111 transmits a processing request including the mouse event to the server, receives an image of content returned from the server, and stores the received image into the embedded area in the display image being stored in the VRAM included in display portion 161. In the case where the Web page includes an instruction to start the second application program, such as a reproducing program, executable by CPU 111, the task of executing the second application program has been formed in CPU 111. Therefore, the mouse event is output to the task for CPU 111 to execute the second application program to cause the task to perform the process based on the mouse event, and an image of content that the task for CPU 111 to execute the second application program has generated is stored into the embedded area in the display image being stored in the VRAM included in display portion 161.

When the task for the server or CPU 111 to execute the second application program receives the mouse event, the task performs a process specified by the mouse event, among a plurality of processes determined by the second application program. Specifically, the task performs the process, among the plurality of processes determined by the second application program, that is assigned to the position specified by the positional information included in the mouse event. For example, when the embedded image includes a button assigned with an enlargement process and when the position specified by the positional information included in the mouse event falls within the button assigned with the enlargement process, then the task performs the enlargement process. The task then updates the embedded area in the display image stored in the VRAM in display portion 161, with an embedded image obtained by the enlargement process. As a result, in the display image being displayed on display portion 161, only the image in the embedded area is enlarged for display.

In the following step S42, CPU 111 erases the mouse event which has been temporarily stored in step S47, and the process proceeds to step S50. This is for preventing the same mouse event from being output twice to the task of executing the second application program. On the other hand, in step S43, CPU 111 determines whether a gesture event has been determined. Specifically, CPU 111 determines whether the gesture event determining process shown in FIG. 8 has been performed and a gesture event has been determined on the basis of the mouse event which has been input in step S37. If the gesture event has been determined, the process proceeds to step S44; otherwise, the process proceeds to step S47. In step S47, CPU 111 temporarily stores the mouse event which has been input in step S37, and the process proceeds to step S50.

In step S44, CPU 111 determines whether the gesture event that has been determined on the basis of the mouse event input in step S37 is of a prescribed type. If so, the process proceeds to step S45; otherwise, the process proceeds to step S41. The prescribed types of gesture events have been predetermined by the browsing program.

In step S45, CPU 111 performs a process corresponding to the gesture event, and the process proceeds to step S46. CPU 111 performs one of the plurality of processes determined by the browsing program that is specified by the gesture event. Specifically, if the gesture event is "Flick", CPU 111 moves the area to be displayed on display portion 161, in the display image, in the direction determined by the gesture event. More specifically, CPU 111 moves the area to be displayed on display portion 161, in the display image stored in the VRAM included in display portion 161, in the direction determined by the gesture event, and displays the moved area on display portion 161. This causes the area, in the display image, being displayed on display portion 161 to be changed. In step S46, CPU 111 erases the mouse event which has been temporarily stored in step S47, as in step S42, and the process proceeds to step S50.

On the other hand, the process proceeds to step S48 when a plurality of mouse events are input in step S37. In step S48, CPU 111 determines whether a gesture event has been determined. CPU 111 determines whether the gesture event determining process shown in FIG. 8 has been performed and a gesture event has been determined on the basis of the mouse events input in step S37. If the gesture event has been determined, the process proceeds to step S49; otherwise, the process proceeds to step S50. In step S49, CPU 111 performs a process corresponding to the gesture event, and the process proceeds to step S50.

In step S50, CPU 111 determines whether it has accepted an instruction to terminate the display of the content. For example, if one of the keys, included in hard key portion 167, that is assigned with an instruction to terminate the browsing program has been designated, CPU 111 accepts the instruction to terminate the display of the content. If so, the process is terminated; otherwise, the process returns to step S37.

Figure 10:
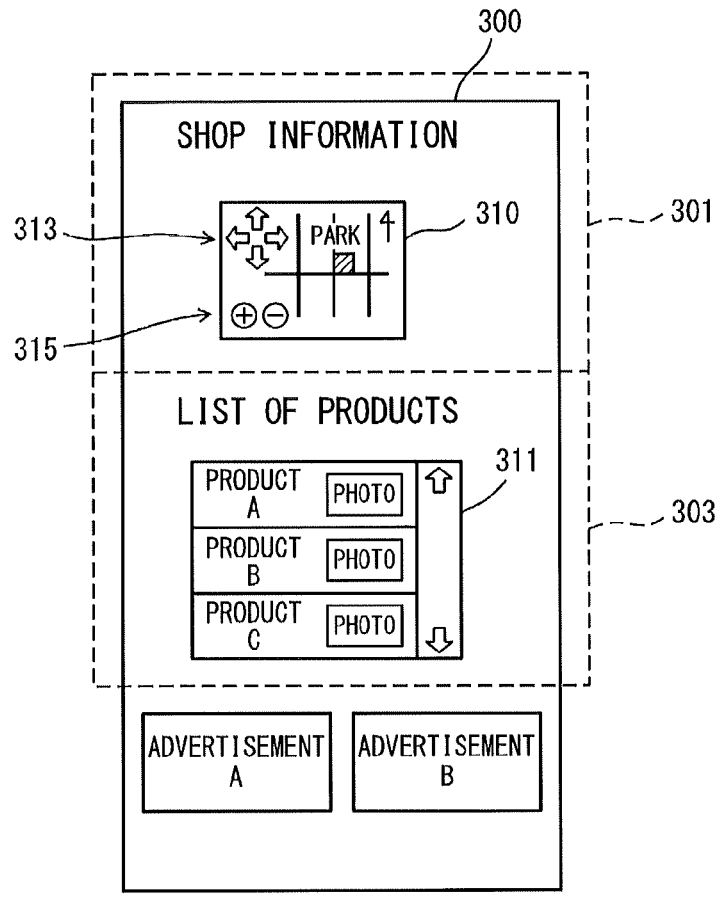
FIG. 10 shows an example of a display image.

FIG. 10 shows an example of a display image. The display image shown in FIG. 10 corresponds to a Web page which has been downloaded from a server connected to the Internet. It is here assumed that the Web page contains an introduction to a shop selling products. Referring to FIG. 10, a display image 300 includes two embedded areas 310 and 311 in each of which an embedded image generated by a second application program different from the browsing program is arranged in the Web page. The embedded images to be arranged in the embedded areas 310, 311 are generated as the server connected to the Internet executes the second application program installed into the server.

In embedded area 310, an image of a map showing the location of the shop is arranged as the embedded image. In embedded area 311, an image showing the list of products sold by the shop is arranged as the embedded image. Areas 301 and 303 delimited by dotted lines each show a display area, in display image 300, to be displayed on display portion 161. It is noted that the dotted lines delimiting areas 301 and 303 are shown for illustration purposes only; the dotted lines do not exist in display image 300.

Figure 11:
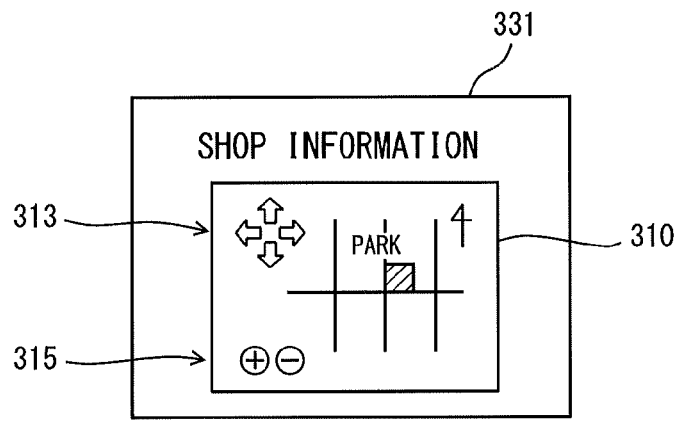
FIGS. 11 to 13 show examples of a display area in the display image.

FIG. 11 shows a first example of a display area in display image 300. Referring to FIG. 11, a display area 331 is an area indicated by area 301 in display image 300 shown in FIG. 10. Display area 331 includes embedded area 310 arranged in display image 300. Embedded area 310 includes buttons 313 having the left, right, up, and down arrows respectively displayed thereon, and buttons 315 having the signs "+" and "−" respectively displayed thereon. Each button in buttons 313 and 315 is assigned with a corresponding process by the second application program which has been installed into the server. When a user uses his/her finger to designate the "+" button in buttons 315, a mouse event including the positional information indicating a position falling within the range where the "+" button is displayed is generated. The flows of the gesture event determining process shown in FIG. 8 and the browsing process shown in FIG. 9 corresponding to this case will be described specifically. In the gesture event determining process shown in FIG. 8, when the user designates the "+" button in buttons 315 with his/her finger, "Release" is detected as the state of the mouse event in step S03, and the process proceeds to step S06. It is then determined that the same position has not been stored, so that steps S08 and S29 are performed. Therefore, a non-determination signal is output, with no gesture event detected. Further, in the browsing process shown in FIG. 9, when the user designates the "+" button in buttons 315 with his/her finger, it is determined in step S37 that a mouse event has been input, and the process proceeds to step S38. In the user operation of designating the "+" button in buttons 315 with his/her finger, a single position falling within the embedded area is designated, and therefore, the process proceeds to step S40. In the gesture event determining process shown in FIG. 8, when the user designates the "+" button in buttons 315 with his/her finger, a non-determination signal is output, and therefore, in the browsing process, step S41 is performed in which a mouse event is output. Consequently, the mouse event is transmitted to the server which is responsible for generating the image arranged in embedded area 310, and the server performs the process of zooming in on the image. Then, embedded area 310 is updated with the image that has undergone the enlargement process by the server.

Figure 12:
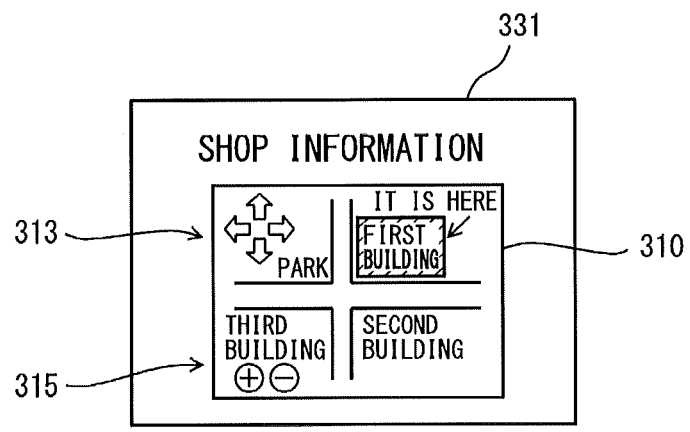

FIG. 12 shows a second example of the display area in display image 300. Referring to FIG. 12, a display area 331 is an area indicated by area 301 in display image 300 shown in FIG. 10. Display area 331 includes embedded area 310 arranged in display image 300. The embedded image displayed in embedded area 310 is an enlarged version of the image arranged in embedded area 310 shown in FIG. 11. Except for the embedded area 310, display area 331 in display image 300 shown in FIG. 12 is identical to display area 331 shown in FIG. 11.

Further, when the operation user touches with his/her finger any position on display area 331 in display image 300 shown in FIG. 12 to input a swipe operation, a gesture event is generated. The flows of the gesture event determining process shown in FIG. 8 and the browsing process shown in FIG. 9 corresponding to this case will be described specifically. In the gesture event determining process shown in FIG. 8, when the user inputs a swipe operation, "Move" is detected as the state of the mouse event in step S03, and the process proceeds to step S09. In the swipe operation, the designated position is moved and the distance of movement per unit time is not less than the threshold value TH, so that the process proceeds to step S15. In this manner, the gesture event with the gesture identification information "Swipe" is determined. Further, in the browsing process shown in FIG. 9, when the user inputs the swipe operation, it is determined in step S37 that a mouse event has been input, and the process proceeds to step S38. The swipe operation is an operation of moving the position designated with one finger, so that the process proceeds to step S40 or S48. In the case where the process proceeds to step S40, or in other words, in the case where the swiped position falls within the embedded area, the process proceeds to step S45, because a gesture event with the gesture identification information "Swipe" is determined in the gesture event determining process shown in FIG. 8. On the other hand, in the case where the process proceeds to step S48, or in other words, in the case where the swiped position is outside the embedded area, the process proceeds to step S49, because a gesture event with the gesture identification information "Swipe" is determined in the gesture event determining process shown in FIG. 8. As such, the position touched by the user's finger may be anywhere within display area 331; it may fall within the embedded area 310. Although a mouse event is generated together with the gesture event, the mouse event is discarded, because the gesture event corresponds to a process of a prescribed type which is predetermined by the browsing program. The browsing program has determined, for the gesture event with the gesture identification information "Swipe", the page turning process of changing the display area in the display image. It is here assumed that the page turning process is performed so that the display area in display image 300 is changed from area 301 to area 303.

Figure 13:
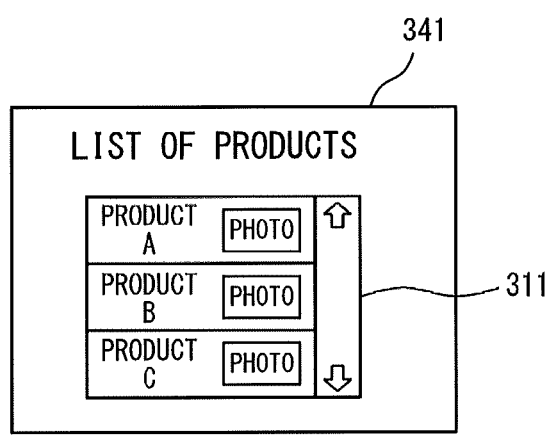

FIG. 13 shows a third example of the display area in display image 300. Shown in FIG. 13 is a display area 341, included in display image 300, which is displayed on display portion 161 after a swipe operation is input in the state where display area 331 shown in FIG. 12 is being displayed on display portion 161. Display area 341 is an area indicated by area 303 in display image 300 shown in FIG. 10. Display area 341 includes embedded area 311 arranged in display image 300. The embedded image displayed in embedded area 311 is the same as the one arranged in embedded area 311 shown in FIG. 10.

As described above, MFP 100 according to the present embodiment functions as a data processing apparatus. When one or more positions designated by a user are detected by touch panel 165, MFP 100 generates one or more mouse events each including a piece of positional information indicating the corresponding position, and determines one of a plurality of gesture events on the basis of a set of the one or more mouse events generated. On the other hand, in the case where a Web page received from the outside includes a description for displaying an embedded image generated as an application program different from a browsing program is executed, MFP 100 generates a display image having the embedded image arranged in an embedded area determined by the Web page. When the display image includes the embedded area, in the case where the position indicated by one of the one or more mouse events on the basis of which the gesture event has been determined falls within the embedded area, MFP 100 selects either the gesture event or the set of the one or more mouse events on the basis of which the gesture event has been determined. Therefore, MFP 100 is able to detect one designation operation made by a user on the display surface of display portion 161 as one or more mouse events and as a gesture event, and is able to accept either the detected mouse event(s) or the detected gesture event which is suitable for a respective one of the browsing program and the application program different from the browsing program. Accordingly, even in the case where a Web page includes a description for executing an application program different from the browsing program, MFP 100 can execute the application program appropriately.

Further, in the case where MFP 100 detects one designation operation made by the user on the display surface of display portion 161 as one or more mouse events and as a gesture event, when the gesture event is of a prescribed type, MFP 100 causes the gesture event to correspond to the browsing program, whereas when the gesture event is not of the prescribed type, MFP 100 causes the one or more mouse events to correspond to the application program different from the browsing program. Accordingly, MFP 100 is able to accept a user operation as an operation corresponding to either the browsing program or the application program. Furthermore, in the case where the browsing program corresponds to the gesture event and the application program corresponds to the mouse event, MFP 100 can execute the application program appropriately.

Further, in the case where the spacing between a first position indicated by a first mouse event and a second position indicated by a second mouse event generated within a prescribed time from the generation of the first mouse event is smaller than a prescribed distance, MFP 100 refrains from determining a gesture event. Accordingly, MFP 100 is able to detect a user operation of moving the designated position on touch panel 165 as a gesture event.

Furthermore, MFP 100 holds (temporarily stores) the generated one or more mouse events until a gesture event is determined or until it is decided not to determine a gesture event. When the set of the one or more mouse events is selected, MFP 100 outputs the one or more mouse events put on hold, to the task of executing the application program. As such, MFP 100 holds any mouse event generated on the basis of a user operation which has been input before a gesture event which is not of a prescribed type is determined or before it is decided not to determine a gesture event. This ensures effectiveness of the user operation; it is unnecessary for the user to input the same operation again.

Furthermore, MFP 100 erases the one or more mouse events put on hold, after they are output to the task of executing the application program. In the case where the gesture event is selected, MFP 100 erases the mouse event(s) at the time when the gesture event is selected. This can prevent a same mouse event from being output more than once.

In the case where the mouse event is selected, MFP 100 outputs the mouse event to the task of executing the application program, to cause the task to update the embedded image displayed in the embedded area. This can cause the task of executing the application program to execute a process in accordance with the mouse event.

Further, in the case where the gesture event is selected, MFP 100 executes a process of the type corresponding to the selected gesture event, among a plurality of types of processes executable by the browsing program. This can cause the task of executing the browsing program to perform the process of determining the display area, in the display image, to be displayed on display portion 161. It is possible to cause the task of executing the browsing program to perform a process in accordance with the gesture event.

Furthermore, at the stage when the browsing program is installed, MFP 100 stores into HDD 115 master table 91 in which a plurality of types of processes determined by the browsing program are associated with corresponding ones of gesture events. This makes it possible to detect only the gesture events corresponding respectively to the plurality of types of processes determined by the browsing program.

While MFP 100 has been described as an example of the data processing apparatus in the above embodiment, the present invention may of course be understood as an operation accepting method for causing CPU 111 controlling MFP 100 to perform the processing shown in FIGS. 8 and 9, or as a browsing program for causing CPU 111 to perform the operation accepting method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus including
a display portion capable of displaying an image,
a position detecting portion capable of detecting one or more positions designated by a user on a display surface of said display portion, and
a control portion,
said control portion comprising:
   a browsing portion to execute a browsing program, externally acquire content described in a markup language, and display on said display portion at least a part of a display image corresponding to said acquired content, and further operable, in response to input of one of a plurality of gesture events corresponding respectively to a plurality of types of processes determined by said browsing program, to perform one of said plurality of types of processes that corresponds to said input gesture event;
   a mouse event generating portion operable, in response to detection of one or more positions by said position detecting portion, to generate one or more mouse events each including a piece of positional information indicating a corresponding one of said one or more positions; and
   a gesture event determining portion to determine one of the plurality of gesture events on the basis of a set of one or more mouse events generated by said mouse event generating portion;
   said browsing portion including
      a display image generating portion operable, in the case where said content includes a description for displaying an embedded image to be generated as an application program different from said browsing program is executed, to generate a display image in which the embedded image generated as said application program has been executed is arranged in an embedded area determined by said content, and
      a selecting portion operable, in the case where a position indicated by one of the one or more mouse events on the basis of which a gesture event has been determined by said gesture event determining portion falls within said embedded area, to select either the gesture event determined by said gesture event determining portion or the set of the one or more mouse events on the basis of which the gesture event has been determined, on the basis of a type of said determined gesture event.

2. The data processing apparatus according to claim 1, wherein said selecting portion includes
   a mouse event selecting portion operable, in the case where the gesture event determined by said gesture event determining portion is not of a prescribed type, to select the one or more mouse events on the basis of which the gesture event has been determined by said gesture event determining portion, and
   a gesture event selecting portion operable, in the case where the gesture event determined by said gesture event determining portion is of said prescribed type, to select the gesture event determined by said gesture event determining portion.

3. The data processing apparatus according to claim 1, wherein said gesture event determining portion includes a deciding portion to decide not to determine a gesture event in the case where a spacing between a first position indicated by a first mouse event generated by said mouse event generating portion and a second position indicated by a second mouse event generated within a prescribed time from the generation of said first mouse event is less than a prescribed distance.

4. The data processing apparatus according to claim 3, wherein said browsing portion further includes
   a holding portion to hold the set of one or more mouse events generated by said mouse event generating portion until a gesture event is determined on the basis of the held set by said gesture event determining portion or until said deciding portion decides not to determine said gesture event, and
   an instructing portion operable, in the case where said set of one or more mouse events is selected by said selecting portion, to output the one or more mouse events included in said held set to a task of executing said application program to cause the task to update the embedded image displayed in said embedded area.

5. The data processing apparatus according to claim 4, wherein said browsing portion further includes an erasing portion operable, in the case where said set of one or more mouse events is selected by said selecting portion, to erase the one or more mouse events included in said held set after the one or more mouse events included in said held set are output to the task of executing said application program by said instructing portion, and operable, in the case where the gesture event is selected by said selecting portion, to erase the one or more mouse events included in said held set at a time when the gesture event is selected by said selecting portion.

6. The data processing apparatus according to claim 1, wherein said browsing portion further includes a determining portion operable, in the case where said gesture event is selected, to perform one of said plurality of types of processes that corresponds to said selected gesture event to thereby determine a display area, in said display image, to be displayed on said display portion.

7. The data processing apparatus according to claim 1, wherein
   said control portion further includes an association portion operable, at a stage when said browsing program is installed, to associate each of said plurality of types of processes determined by said browsing program with one of the plurality of gesture events in correspondence with said browsing program, and said gesture event determining portion determines said gesture event on a condition that the gesture event corresponding to the set of one or more mouse events generated by said mouse event generating portion is associated with one of said plurality of types of processes by said association portion in correspondence with said browsing program.

8. The data processing apparatus according to claim 1, further comprising
a mouse event outputting portion operable, in the case where the set of one or more mouse events is selected by said selecting portion, to output said set of one or more mouse events so as to cause said application program to perform a process on the basis of said set of one or more mouse events, and
a gesture event outputting portion operable, in the case where said gesture event is selected by said selecting portion, to output said gesture event so as to perform the one of said plurality of types of processes that corresponds to said selected gesture event.

9. An operation accepting method performed by a data processing apparatus, the data processing apparatus including
a display portion capable of displaying an image and
a position detecting portion capable of detecting one or more positions designated by a user on a display surface of said display portion,
the method comprising:
a browsing step of executing a browsing program, externally acquiring content described in a markup language, and displaying on said display portion at least a part of a display image corresponding to said acquired content, and further, in response to input of one of a plurality of gesture events corresponding respectively to a plurality of types of processes determined by said browsing program, performing one of said plurality of types of processes that corresponds to said input gesture event;
a mouse event generating step of, in response to detection of one or more positions by said position detecting portion, generating one or more mouse events each including a piece of positional information indicating a corresponding one of said one or more positions; and
a gesture event determining step of determining one of the plurality of gesture events on the basis of a set of one or more mouse events generated in said mouse event generating step;
said browsing step including
a display image generating step of, in the case where said content includes a description for displaying an embedded image which is generated as an application program different from said browsing program is executed, generating a display image in which the embedded image generated as said application program has been executed is arranged in an embedded area determined by said content, and
a selecting step of, in the case where a position indicated by one of the one or more mouse events on the basis of which a gesture event has been determined in said gesture event determining step falls within said embedded area, selecting either the gesture event determined in said gesture event determining step or the set of the one or more mouse events on the basis of which the gesture event has been determined, on the basis of a type of said determined gesture event.

10. The operation accepting method according to claim 9, wherein said selecting step includes
a mouse event selecting step of, in the case where the gesture event determined in said gesture event determining step is not of a prescribed type, selecting the one or more mouse events on the basis of which the gesture event has been determined in said gesture event determining step, and
a gesture event selecting step of, in the case where the gesture event determined in said gesture event determining step is of said prescribed type, selecting the gesture event determined in said gesture event determining step.

11. The operation accepting method according to claim 9, wherein said gesture event determining step includes a deciding step of deciding not to determine a gesture event in the case where a spacing between a first position indicated by a first mouse event generated in said mouse event generating step and a second position indicated by a second mouse event generated within a prescribed time from the generation of said first mouse event is less than a prescribed distance.

12. The operation accepting method according to claim 11, wherein said browsing step further includes
a holding step of holding the set of one or more mouse events generated in said mouse event generating step until a gesture event is determined on the basis of the held set in said gesture event determining step or until it is decided not to determine said gesture event in said deciding step, and
an instructing step of, in the case where said set of one or more mouse events is selected in said selecting step, outputting the one or more mouse events included in said held set to the task of executing said application program to thereby cause a task to update the embedded image displayed in said embedded area.

13. The operation accepting method according to claim 12, wherein said browsing step further includes an erasing step of, in the case where said set of one or more mouse events is selected in said selecting step, erasing the one or more mouse events included in said held set after the one or more mouse events included in said held set are output to the task of executing said application program in said instructing step, and, in the case where the gesture event is selected in said selecting step, erasing the one or more mouse events included in said held set at a time when the gesture event is selected in said selecting step.

14. The operation accepting method according to claim 9, wherein said browsing step further includes a determining step of, in the case where said gesture event is selected, determining a display area, in said display image, to be displayed on said display portion by performing one of said plurality of types of processes that corresponds to said selected gesture event.

15. The operation accepting method according to claim 9, further comprising an associating step of, at a stage when said browsing program is installed, associating each of said plurality of types of processes determined by said browsing program with one of the plurality of gesture events in correspondence with said browsing program, wherein
said gesture event determining step includes a step of determining said gesture event on a condition that the gesture event corresponding to the set of one or more mouse events generated in said mouse event generating step is associated with one of said plurality of types of processes in said associating step in correspondence with said browsing program.

16. The operation accepting method according to claim 9, further comprising
a mouse event outputting step of, in the case where the set of one or more mouse events is selected in said selecting step, outputting said set of one or more mouse events so as to cause said application program to perform a process on the basis of said set of one or more mouse events, and a gesture event outputting step of, in the case where said gesture event is selected in said selecting step, outputting said gesture event so as to perform the one of said plurality of types of processes that corresponds to said selected gesture event.

17. A non-transitory computer-readable recording medium encoded with a browsing program performed by a computer which controls a data processing apparatus, said data processing apparatus including a display portion capable of displaying an image, a position detecting portion capable of detecting one or more positions designated by a user on a display surface of said display portion, a mouse event generating portion operable, in response to detection of one or more positions by said position detecting portion, to generate one or more mouse events each including a piece of positional information indicating a corresponding one of said one or more positions, and a gesture event determining portion to determine one of a plurality of gesture events on the basis of a set of one or more mouse events generated by said mouse event generating portion, the browsing program causing said computer to perform:

a browsing step of executing the browsing program, externally acquiring content described in a markup language, and displaying on said display portion at least a part of a display image corresponding to said acquired content, and further, in response to input of one of the plurality of gesture events corresponding respectively to a plurality of types of processes determined by said browsing program, performing one of said plurality of types of processes that corresponds to said input gesture event, said browsing step including a display image generating step of, in the case where said content includes a description for displaying an embedded image to be generated as an application program different from said browsing program is executed, generating a display image in which the embedded image generated as said application program has been executed is arranged in an embedded area determined by said content, and a selecting step of, in the case where a position indicated by one of the one or more mouse events on the basis of which a gesture event has been determined by said gesture event determining portion falls within said embedded area, selecting either the gesture event determined by said gesture event determining portion or the set of the one or more mouse events on the basis of which the gesture event has been determined, on the basis of a type of said determined gesture event.

18. The non-transitory computer-readable recording medium encoded with the browsing program according to claim 17, wherein said selecting step includes a mouse event selecting step of, in the case where the gesture event determined by said gesture event determining portion is not of a prescribed type, selecting the one or more mouse events on the basis of which the gesture event has been determined by said gesture event determining portion, and a gesture event selecting step of, in the case where the gesture event determined by said gesture event determining portion is of said prescribed type, selecting the gesture event determined by said gesture event determining portion.

19. The non-transitory computer-readable recording medium encoded with the browsing program according to claim 17, wherein said gesture event determining portion decides not to determine a gesture event in the case where a spacing between a first position indicated by a first mouse event generated by said mouse event generating portion and a second position indicated by a second mouse event generated within a prescribed time from the generation of said first mouse event is less than a prescribed distance.

20. The non-transitory computer-readable recording medium encoded with the browsing program according to claim 19, wherein said browsing step further includes a holding step of holding the set of one or more mouse events generated by said mouse event generating portion until a gesture event is determined on the basis of the held set by said gesture event determining portion or until it is decided not to determine said gesture event by said gesture event determining portion, and an instructing step of, in the case where said set of one or more mouse events is selected in said selecting step, outputting the one or more mouse events included in said held set to a task of executing said application program to cause the task to update the embedded image displayed in said embedded area.

21. The non-transitory computer-readable recording medium encoded with the browsing program according to claim 20, wherein said browsing step further includes an erasing step of, in the case where said set of one or more mouse events is selected in said selecting step, erasing the one or more mouse events included in said held set after the one or more mouse events included in said held set are output to the task of executing said application program in said instructing step, and, in the case where the gesture event is selected in said selecting step, erasing the one or more mouse events included in said held set at a time when the gesture event is selected in said selecting step.

22. The non-transitory computer-readable recording medium encoded with the browsing program according to claim 17, wherein said browsing step further includes a determining step of, in the case where said gesture event is selected, performing one of said plurality of types of processes that corresponds to said selected gesture event to thereby determine a display area, in said display image, to be displayed on said display portion.

23. The non-transitory computer-readable recording medium encoded with the browsing program according to claim 17, causing said computer to further perform an associating step of, at a stage when said browsing program is installed, associating each of said plurality of types of processes determined by said browsing program with one of the plurality of gesture events in correspondence with said browsing program, wherein said gesture event determining portion determines said gesture event on a condition that the gesture event corresponding to the set of one or more mouse events generated by said mouse event generating portion is associated with one of said plurality of types of processes in said associating step in correspondence with said browsing program.

24. The non-transitory computer-readable recording medium encoded with the browsing program according to claim 17, further comprising a mouse event outputting step of, in the case where the set of one or more mouse events is selected in said selecting step, outputting said set of one or more mouse events so as to cause said application program to perform a process on the basis of said set of one or more mouse events, and a gesture event outputting step of, in the case where said gesture event is selected in said selecting step, outputting said gesture event so as to perform the one of said plurality of types of processes that corresponds to said selected gesture event.

* * * * *